United States Patent
Alameh et al.

(10) Patent No.: US 11,455,411 B2
(45) Date of Patent: Sep. 27, 2022

(54) CONTROLLING CONTENT VISIBILITY ON A COMPUTING DEVICE BASED ON COMPUTING DEVICE LOCATION

(71) Applicant: Motorola Mobility LLC, Chicago, IL (US)

(72) Inventors: Rachid M. Alameh, Crystal Lake, IL (US); Jarrett K. Simerson, Glenview, IL (US); John J. Gorsica, IV, Round Lake, IL (US); Zhengping Ji, Hinsdale, IL (US)

(73) Assignee: Motorola Mobility LLC, Chicago, IL (US)

( * ) Notice: Subject to any disclaimer, the term of this patent is extended or adjusted under 35 U.S.C. 154(b) by 418 days.

(21) Appl. No.: 16/394,290

(22) Filed: Apr. 25, 2019

(65) Prior Publication Data

US 2020/0342133 A1    Oct. 29, 2020

(51) Int. Cl.
    *G06F 21/62* (2013.01)

(52) U.S. Cl.
    CPC ...... *G06F 21/6218* (2013.01); *G06F 21/6245* (2013.01); *G06F 2221/2111* (2013.01)

(58) Field of Classification Search
    CPC ............ G06F 21/6218; G06F 21/6245; G06F 2221/2111
    See application file for complete search history.

(56) References Cited

U.S. PATENT DOCUMENTS

| | | | |
|---|---|---|---|
| 9,092,969 B2 * | 7/2015 | McCown | H04M 11/04 |
| 9,355,231 B2 * | 5/2016 | Disraeli | H04W 4/02 |
| 10,380,425 B2 | 8/2019 | Wexler et al. | |
| 10,386,960 B1 | 8/2019 | Smith | |
| 10,701,067 B1 | 6/2020 | Ziraknejad et al. | |
| 10,963,586 B1 | 3/2021 | Sculley et al. | |
| 2005/0221798 A1 | 10/2005 | Sengupta et al. | |

(Continued)

FOREIGN PATENT DOCUMENTS

| | | |
|---|---|---|
| EP | 3291167 | 7/2018 |
| EP | 2992692 | 8/2018 |

OTHER PUBLICATIONS

"Non-Final Office Action", U.S. Appl. No. 16/394,327, filed Nov. 24, 2020, 18 pages.

(Continued)

*Primary Examiner* — Richard A McCoy
(74) *Attorney, Agent, or Firm* — FIG. 1 Patents

(57) ABSTRACT

Content visibility on a computing device is controlled based at least in part on the current location of the computing device. When the current location is a safe location for making user-selectable content visible on a display screen of the computing device and the computing device is unlocked, the computing device operates in a full content visibility mode. In the full content visibility mode all user-selectable content on the computing device is accessible to a user of the computing device. When the current location is not a safe location for making user-selectable content visible on the display screen, the computing device operates in a reduced content visibility mode. In the reduced content visibility mode content visibility on the display screen is reduced, such as by limiting which applications (e.g., application icons or widgets) are displayed or otherwise accessible to the user.

20 Claims, 12 Drawing Sheets

(56) References Cited

U.S. PATENT DOCUMENTS

| | | | |
|---|---|---|---|
| 2007/0067738 A1* | 3/2007 | Flynt | H04M 1/72403 |
| | | | 715/810 |
| 2008/0186162 A1* | 8/2008 | Rajan | H04W 8/22 |
| | | | 340/539.13 |
| 2011/0214158 A1 | 9/2011 | Pasquero et al. | |
| 2013/0225309 A1 | 8/2013 | Bentley et al. | |
| 2013/0254401 A1* | 9/2013 | Marshall | G06F 21/6218 |
| | | | 709/226 |
| 2014/0033326 A1* | 1/2014 | Chien | G06F 21/604 |
| | | | 726/28 |
| 2014/0129231 A1 | 5/2014 | Herring et al. | |
| 2015/0070461 A1 | 3/2015 | Nace et al. | |
| 2015/0161701 A1 | 6/2015 | Bretscher et al. | |
| 2015/0178822 A1 | 6/2015 | Babiarz et al. | |
| 2015/0288719 A1 | 10/2015 | Freudiger et al. | |
| 2015/0310434 A1* | 10/2015 | Cheung | H04W 12/06 |
| | | | 705/44 |
| 2015/0370323 A1 | 12/2015 | Cieplinski et al. | |
| 2015/0373050 A1* | 12/2015 | Dayan | H04L 63/20 |
| | | | 726/3 |
| 2015/0381633 A1 | 12/2015 | Grim et al. | |
| 2016/0011767 A1 | 1/2016 | Jung et al. | |
| 2016/0050209 A1 | 2/2016 | Govande et al. | |
| 2016/0055324 A1 | 2/2016 | Agarwal | |
| 2016/0164865 A1* | 6/2016 | Speicher | G06F 21/316 |
| | | | 726/4 |
| 2016/0224779 A1 | 8/2016 | Kitane et al. | |
| 2016/0253141 A1 | 9/2016 | Sarkar et al. | |
| 2016/0255068 A1 | 9/2016 | Pritchard et al. | |
| 2016/0378302 A1 | 12/2016 | Gilger et al. | |
| 2017/0041789 A1 | 2/2017 | Waldron et al. | |
| 2017/0116846 A1 | 4/2017 | Wengrovitz et al. | |
| 2017/0193303 A1 | 7/2017 | Wexler et al. | |
| 2018/0137681 A1 | 5/2018 | Chang et al. | |
| 2018/0217966 A1 | 8/2018 | Buttolo et al. | |
| 2018/0350144 A1 | 12/2018 | Rathod | |
| 2019/0089831 A1 | 3/2019 | Medlen et al. | |
| 2019/0171806 A1 | 6/2019 | Embrechts et al. | |
| 2019/0182670 A1 | 6/2019 | Maragoudakis | |
| 2019/0205010 A1 | 7/2019 | Fujii et al. | |
| 2019/0243989 A1* | 8/2019 | Kalva | H04W 12/08 |
| 2019/0286298 A1 | 9/2019 | Wantland et al. | |
| 2019/0373472 A1* | 12/2019 | Smith | H04L 9/3239 |
| 2020/0285752 A1 | 9/2020 | Wyatt et al. | |
| 2020/0304445 A1 | 9/2020 | Dinhthi et al. | |
| 2020/0342076 A1 | 10/2020 | Alameh et al. | |
| 2020/0342144 A1 | 10/2020 | Alameh et al. | |
| 2020/0344213 A1 | 10/2020 | Gorsica et al. | |
| 2021/0320904 A1 | 10/2021 | Gorsica, et al. | |

OTHER PUBLICATIONS

"Non-Final Office Action", U.S. Appl. No. 16/394,264, filed Oct. 5, 2020, 46 pages.

"Final Office Action", U.S. Appl. No. 16/394,264, filed Mar. 18, 2021, 44 pages.

"Notice of Allowance", U.S. Appl. No. 16/394,327, filed Apr. 14, 2021, 13 pages.

"Notice of Allowance", U.S. Appl. No. 16/394,264, filed Apr. 23, 2021, 20 pages.

"Restriction Requirement", U.S. Appl. No. 16/394,307, filed May 19, 2021, 7 pages.

"Android Developers—Docs—Guides—VPN", Retrieved at: https://developer.android.com/guide/topics/connectivity/vpn—on Mar. 20, 2019, 12 pages.

"Locly Native App Platform", Retrieved at: https://locly.com/—on Apr. 19, 2019, 15 pages.

"Lock your Windows 10 PC automatically when you step away from it", Retrieved at: https://support.microsoft.com/en-us/help/4028111/windows-lock-your-windows-10-pc-automatically-when-you-step-away-from—on Apr. 19, 2019, 2 pages.

Sprager, "Inertial Sensor-Based Gait Recognition: A Review", Sep. 2, 2015, pp. 22090-22127.

"Corrected Notice of Allowability", U.S. Appl. No. 16/394,327, filed Jul. 6, 2021, 2 pages.

"Non-Final Office Action", U.S. Appl. No. 16/394,307, filed Sep. 15, 2021, 10 pages.

"Supplemental Notice of Allowability", U.S. Appl. No. 16/394,264, filed Jul. 22, 2021, 3 pages.

U.S. Appl. No. 16/394,307, "Non-Final Office Action", U.S. Appl. No. 16/394,307, filed Jul. 18, 2022, 20 pages.

"Final Office Action", U.S. Appl. No. 16/394,307, filed Mar. 29, 2022, 18 pages.

* cited by examiner

CONTROLLING CONTENT VISIBILITY ON A COMPUTING DEVICE BASED ON COMPUTING DEVICE LOCATION

BACKGROUND

As technology has advanced, computing devices have become increasingly commonplace in our lives. For example, many people have mobile devices such as phones or tablets that they carry with them and use throughout the day. While these devices have provided many benefits to our lives, they are not without their problems. One such problem is that oftentimes people keep confidential information or applications on the device they do not want another person to see or have access to. For example, a user may be in a crowded location where other people can see what is displayed on his device when he unlocks it. Some devices do support multiple user accounts, but switching between user accounts can be cumbersome, and some devices (e.g., many mobile phones) do not support multiple user accounts. These difficulties in using their devices can be frustrating for users, resulting in user dissatisfaction with their devices.

BRIEF DESCRIPTION OF THE DRAWINGS

Embodiments of controlling content visibility on a computing device based on computing device location are described with reference to the following drawings. The same numbers are used throughout the drawings to reference like features and components.

DETAILED DESCRIPTION

Figure 1:
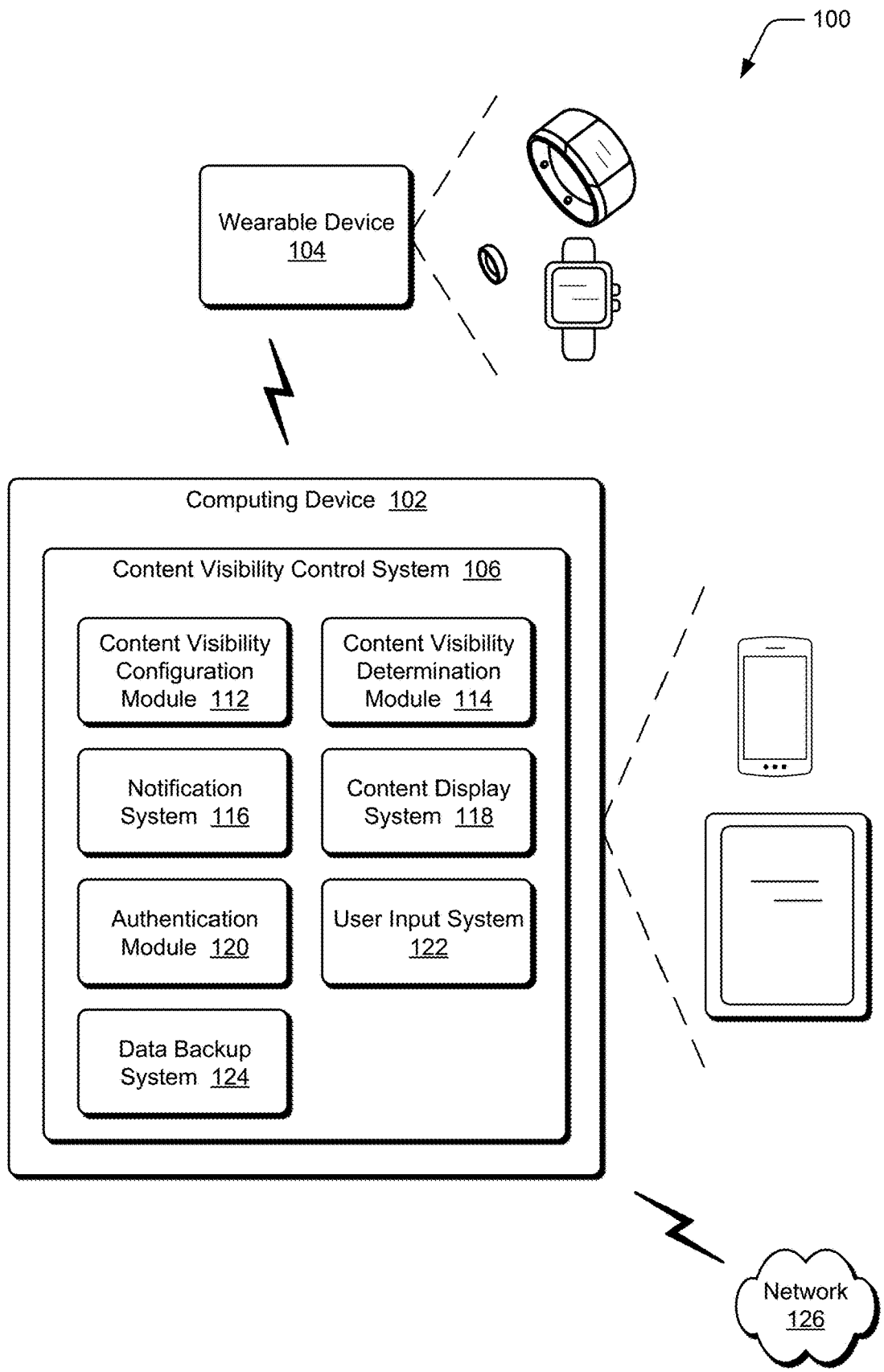
FIG. 1 illustrates an example environment in which the techniques discussed herein can be used.

Controlling content visibility on a computing device based on computing device location is discussed herein. In one or more embodiments, content visibility on a computing device is controlled based at least in part on the current location of the computing device. The current location of the computing device is determined, and a determination is made as to whether the current location is a safe location for making user-selectable content visible on a display screen of the computing device. If the computing device is unlocked and the current location is a safe location for making user-selectable content visible on a display screen of the computing device, then the computing device operates in a full content visibility mode. The computing device is unlocked in response to an authentication input that verifies a user is authorized to access user-selectable content and functionality of the computing device. In the full content visibility mode content is fully visible on the computing device display screen. Content being fully visible on the computing device display screen includes all user-selectable content on the computing device being displayed on the display screen of the computing device. It should be noted that not all user-selectable content may be displayed concurrently. Rather, the user may access different pages displaying different user-selectable content.

However, if the computing device is unlocked and the current location is not a safe location for making user-selectable content visible on a display screen of the computing device, then the computing device operates in a reduced content visibility mode. In the reduced content visibility mode content visibility on the computing device display screen is reduced. Content visibility can be reduced in various manners, such as by limiting which applications (e.g., application icons or widgets) are displayed or accessible/unlocked to the user to the user. The content that is accessible (e.g., displayed) in the reduced content visibility mode is also referred to as a reduced subset of the user-selectable content. It should be noted that not all content in the reduced subset of user-selectable content may be displayed concurrently. Rather, the user may access different pages displaying different content in the reduced subset of user-selectable content.

Additionally or alternatively, a user of a computing device has a wearable device that is associated with the computing device. This association can be made in any of a variety of different manners, such as by pairing the wearable device with the computing device (e.g., using Bluetooth pairing). Content visibility on the computing device is controlled based at least in part on the proximity of the wearable device to the computing device. When the wearable device is in close proximity to the computing device (and optionally the user is authenticated to the wearable device, or the user is wearing the wearable device, or the user is both authenticated to the wearable device and wearing the wearable device) and the computing device is unlocked, the computing device operates in a full content visibility mode. The computing device can be automatically unlocked in response to the wearable device being in close proximity to the computing device (and optionally the user is authenticated to the wearable device, or the user is wearing the wearable device, or the user is both authenticated to the wearable device and wearing the wearable device), or the computing device can be unlocked in response to additional user input (e.g., input of a passcode to the computing device or wearable device, having a fingerprint scanned by the computing device or wearable device). In contrast, when the wearable device is not in close proximity to the computing device (or optionally not worn by the user or the user is not authenticated to the wearable device), such as if the owner hands the phone to a friend or someone took the device, and the computing device is unlocked, the computing device operates in a reduced content visibility mode.

The techniques discussed herein enhance the security of a computing device, assuring the owner of the computing device that content the owner does not want others to see or access will not be accessible to other users with which the owner is sharing the computing device or that can see the display screen of the computing device. This enhanced security is provided without the need for separate user accounts on the computing device, allowing the computing device to switch between the full content visibility mode and the reduced content visibility mode without having a user(s) log into different accounts. For example, if the current location of the computing device is a safe location for making user-selectable content visible on a display screen of the computing device, then user-selectable content on the computing device is fully visible to the owner. However, if the current location of the computing device is not a safe location for making user-selectable content visible on a display screen of the computing device, then user-selectable content on the computing device is not fully visible to the owner. Rather, a reduced subset of the user-selectable content is visible to the owner or other user of the computing device. The owner can specify which content is in the reduced subset of user-selectable content, allowing the owner to control what user-selectable content is visible when the current location of the computing device is not a safe location for making user-selectable content visible on the display screen.

FIG. 1 illustrates an example environment 100 in which the techniques discussed herein can be used. The environment 100 includes a computing device 102 and a wearable device 104. The computing device 102 can be, or include, many different types of computing or electronic devices. For example, the computing device 102 can be a mobile device designed to be easily carried by a user, such as a smartphone or other wireless phone, a notebook computer (e.g., netbook or ultrabook), a laptop computer, an augmented reality headset or device, a virtual reality headset or device, a tablet or phablet computer, an entertainment device (e.g., a gaming console, a portable gaming device, a streaming media player, a digital video recorder, a music or other audio playback device), and so forth. By way of further example, the computing device 102 can be a device designed to be more stationary than mobile, such as a desktop computer, a television, a television set-top box, and so forth.

The wearable device 104 can be, or include, many different types of portable computing or electronic devices. The wearable device 104 is a device designed to be worn by a user or regularly carried by a user. For example, the wearable device 104 can be a smartwatch, an augmented reality headset or device, a virtual reality headset or device, jewelry (e.g., a ring, a bracelet, a necklace), a fitness tracker, a key fob, and so forth. E.g., the computing device 102 can be a smartphone and the wearable device 104 can be a smartwatch. By way of further example, the wearable device 104 can be a mobile device, particularly in situations where the computing device 102 is a stationary device. E.g., the computing device 102 can be a desktop computer and the wearable device 104 can be a smartphone.

The computing device 102 includes a content visibility control system 106. The content visibility control system 106 controls content visibility on a display screen of the computing device 102. The content visibility control system 106 includes a content visibility configuration module 112, a content visibility determination module 114, a notification system 116, a content display system 118, an authentication module 120, a user input system 122, and a data backup system 124.

The content visibility configuration module 112 configures the reduced content visibility mode. In one or more implementations, the content visibility configuration module 112 facilitates user selection of which content on the computing device 102 is not to be accessible in the reduced content visibility mode. In one or more embodiments, the content visibility determination module 114 determines whether a wearable device 104 associated with the computing device 102 and an authorized user of the computing device 102 is in close proximity to the computing device 102. Additionally or alternatively, the content visibility determination module 114 determines whether a current location of the computing device 102 is a safe location for making user-selectable content visible on a display screen of the computing device 102.

The notification system 116 provides various alerts, updates, and other notifications to the user of the computing device 102. The content display system 118 manages the display of content on the display screen of the computing device 102. The authentication module 120 authenticates a user of the computing device 102, such as using a password, personal identification number (PIN), passcode, fingerprint scan, face scan, voice authentication, and so forth. The information to authenticate the user can be provided by the user as inputs to the computing device 102 and/or to the wearable device 104. The user input system 122 receives inputs of a user, such as gesture inputs via a touchscreen, touching or tapping inputs via a touchscreen, text inputs, audio inputs, and so forth. The data backup system 124 backs up new data to the cloud (e.g., to one or more servers via the network 126) in situations in which the wearable device 104 is not in close proximity to the computing device 102 or the current location of the computing device 102 is not a safe location for making user-selectable content visible on a display screen of the computing device.

The wearable device 104 is associated with the computing device 102. In one or more embodiments, the wearable device 104 is associated with the computing device 102 by pairing the wearable device 104 with the computing device 102 (e.g., using Bluetooth pairing). Additionally or alternatively, this association can be made in other manners. For example, the owner of the wearable device 104 and the computing device 102 can manually input to the computing device 102 an identifier of the wearable device 104, and manually input to the wearable device 104 an identifier of the computing device 102. Associating the wearable device 104 with the computing device 102 allows the computing device 102 to operate in the full content visibility mode when a wearable device 104 known to the computing device 102 (associated with the computing device 102) is within close proximity to the computing device 102.

The wearable device 104 can also be associated with a particular user of the computing device 102. This association can be implicit. For example, when the wearable device 104 is associated with the computing device 102, the user is logged into the computing device 102 (e.g., using his or her name and password, using a scanned fingerprint, using a PIN). The user logged into the computing device 102 when the wearable device 104 was paired with the computing device 102 is the user associated with the wearable device 104. The computing device 102 can, for example, pass an identifier of the user to the wearable device 104.

Additionally or alternatively, this association of the wearable device 104 with a particular user of the computing device 102 can also be explicit. For example the user can authenticate himself or herself to both the wearable device 104 and the computing device 102 (e.g., using his or her name and password, using a scanned fingerprint, using a PIN). The wearable device 104 and the computing device 102 can then communicate with each other and verify that the same user (e.g., same user identifier) has authenticated himself or herself to one or both of the wearable device 104 and the computing device 102.

The computing device 102 operates in either a full content visibility mode or a reduced content visibility mode. In the full content visibility mode content is fully visible on the display screen of the computing device 102, typically across multiple different pages (e.g., all applications are visible and accessible). Content being fully visible on the computing device screen includes all user-selectable content on the computing device being displayed on a display screen of the computing device 102. User-selectable content refers to content that a user can select to activate or display (e.g., run applications, display images, call phone numbers), as well as settings or preferences for the computing device 102 that a user can select (e.g., background images, wallpapers, lock screen images) and notifications, alerts, and updates associated with content that a user can select to activate or display (e.g., meeting notifications, text message alerts, availability of a new version of an application). User-selectable content also refers to user selectable setting controls, such as setting controls for enabling/disabling wireless links, setting controls for security, setting controls for adding/removing accounts, and so forth.

In the reduced content visibility mode content visibility on the display screen of the computing device 102 is reduced. Content visibility being reduced refers to content not being accessible to the user, such as not being fully visible on the computing device screen, being blurred or scrambled on the device screen, or being visible but otherwise not accessible (e.g., locked). Whether the computing device 102 is to operate in the full content visibility mode or the reduced content visibility mode can be determined in different manners, such as whether the wearable device 104 is in close proximity to the computing device 102, or whether a current location of the computing device 102 is a safe location for making user-selectable content visible on a display screen of the computing device 102.

Figure 2:
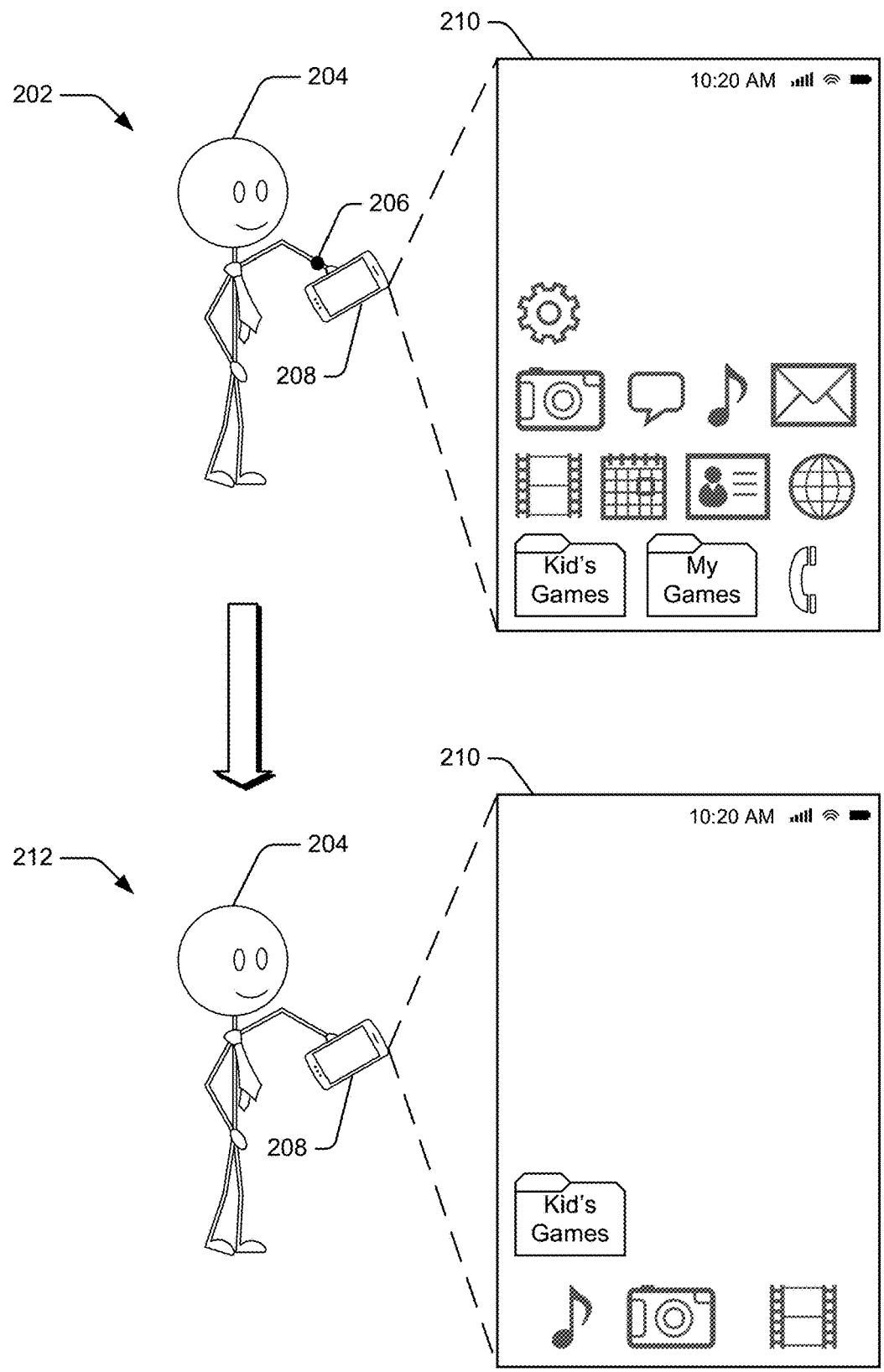
FIGS. 2, 3, 4, and 5 illustrate example operations of the techniques discussed herein.

FIG. 2 illustrates an example operation of the techniques discussed herein. At 202 a user 204 is illustrated. The user 204 is wearing a wearable device 206 illustrated as a smartwatch, and has a computing device 208 illustrated as a smartphone. At 202 the wearable device 206 is in close proximity to the computing device 208 and the computing device 208 is unlocked, so the computing device 208 is operating in a full content visibility mode. As illustrated by display screen 210, in the full content visibility mode all user-selectable content on the computing device 208 is visible on the display screen 210. The user-selectable content is illustrated as two folders labelled "Kid's Games" and "My Games", as well as several icons that represent applications or operating system programs that can be selected by the user 204 for execution. For example, a gear icon represents a settings program, a camera icon represents an image capture program, a speech balloon icon represents a texting application, a music note icon represents a music playback program, an envelope icon represents an email application, a film strip icon represents a video playback program, a calendar icon represents a calendaring program, a business card icon represents a contact list program, a globe icon represents a web browser, and a telephone handset icon represents a telephone communication program.

At 212 the user is illustrated at a later time than at 202. At 212, the user 204 is no longer wearing the wearable device 206. Accordingly, at 212 the computing device 208 is unlocked but the wearable device 206 is not in close proximity to the computing device 208, so the computing device 208 is operating in a reduced content visibility mode. As illustrated by display screen 210, in the reduced content visibility mode a reduced subset of user-selectable content is visible on the display screen 210. The user-selectable content is illustrated as a folder labelled "Kid's Games" as well as a music note icon that represents a music playback program, a camera icon that represents an image capture program, and a film strip icon that represents a video playback program. Icons representing several programs that are not user-selectable content in the reduced content visibility mode are not displayed. For example, compared to the display screen 210, the gear icon, the speech balloon icon, the envelope icon, the calendar icon, the business card icon, the globe icon, and the telephone handset icon are not displayed. Without these icons being displayed, the user 204 is unable to select these icons and run the settings program, the texting application, the email application, the calendaring program, the contact list program, the web browser, and the telephone communication program, respectively.

Figure 3:
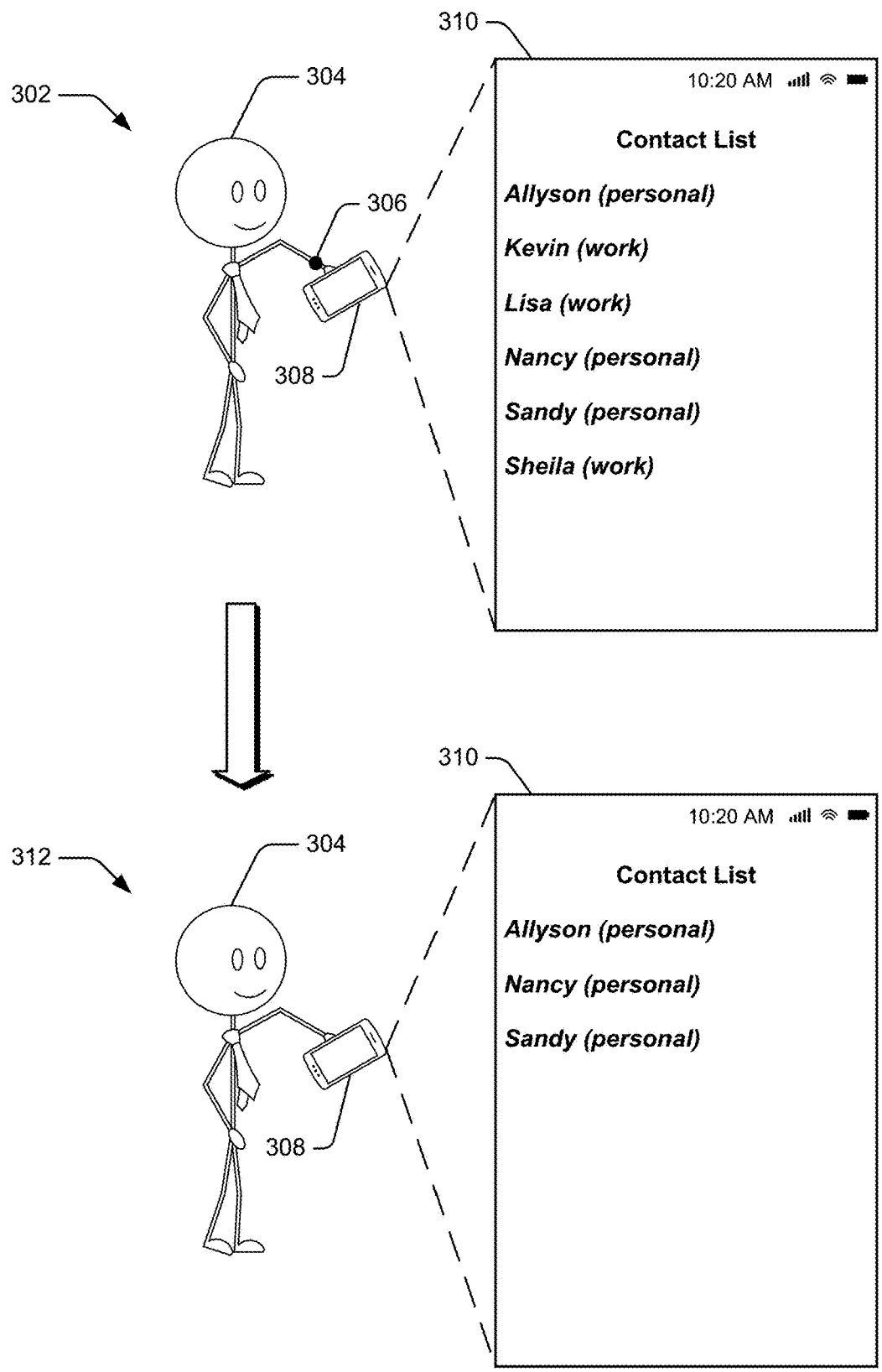

FIG. 3 illustrates another example operation of the techniques discussed herein. At 302 the user 304 wearing a wearable device 306, illustrated as a smartwatch, and having a computing device 308 illustrated as a smartphone, is illustrated. At 302 the wearable device 306 is in close proximity to the computing device 308 and the computing device 308 is unlocked, so the computing device 308 is operating in a full content visibility mode. As illustrated by display screen 310, in the full content visibility mode all user-selectable content on the computing device is visible on the display screen 310. The user-selectable content is illustrated as a contacts list and an individual's name can be selected by the user to display various contact information regarding the individual (e.g., phone numbers, email addresses, mailing addresses), to contact an individual (e.g., call a phone number, send a text message). The contacts list includes various names and an indication of whether the individual is a personal or work contact.

At 312 the user is illustrated at a later time than at 302. At 312, the user 304 is no longer wearing the wearable device 306. Accordingly, at 312 the computing device 308 is unlocked but the wearable device 306 is not in close proximity to the computing device 208, so the computing device 308 is operating in a reduced content visibility mode. As illustrated by display screen 310, in the reduced content visibility mode a reduced subset of user-selectable content is visible on the display screen 310. The user-selectable content is illustrated as a contacts list that includes only personal contacts, not work contacts. Without these contacts being displayed, the user 304 is unable to select these contacts and obtain contact information for, or contact, the work contacts.

Figure 4:
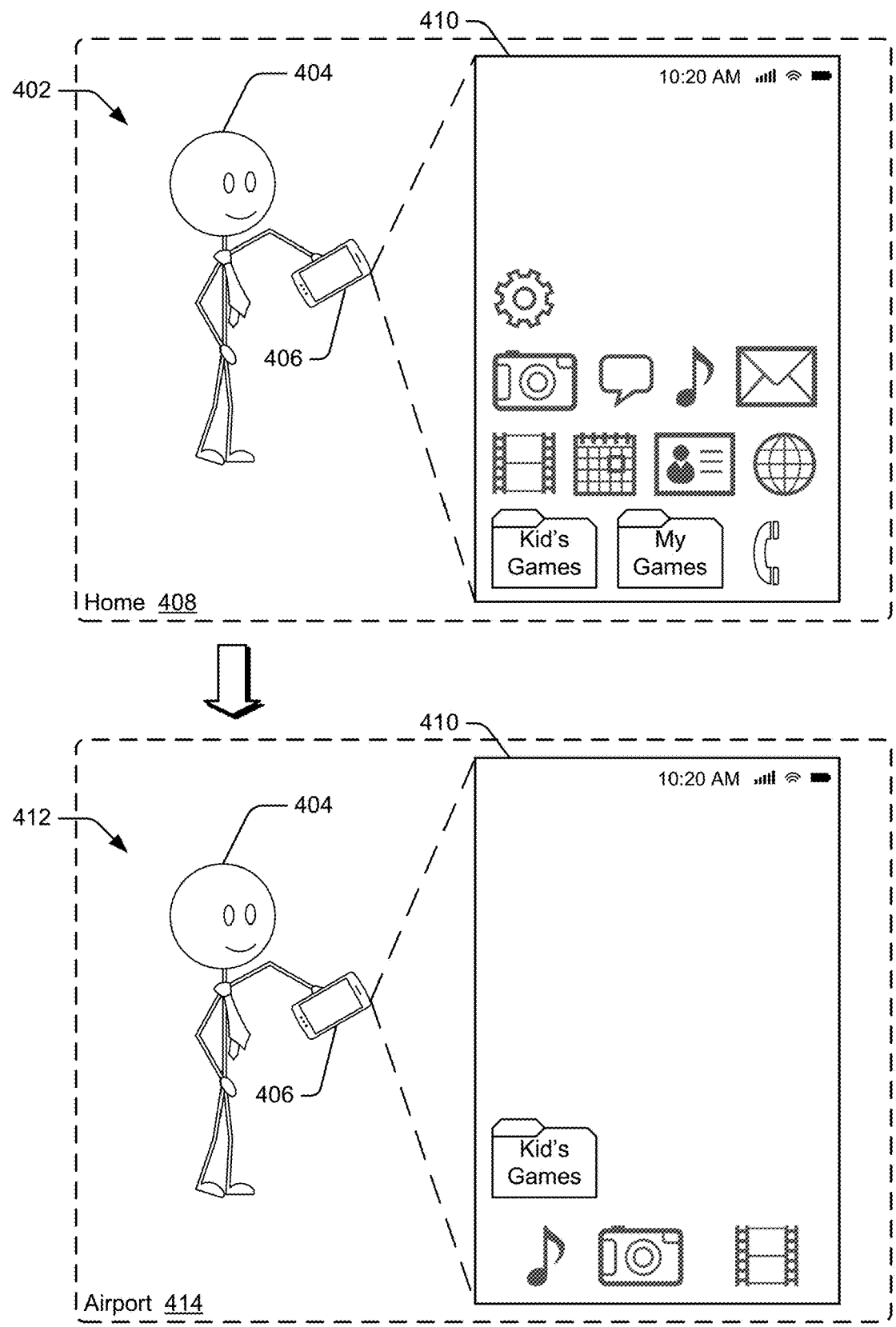

FIG. 4 illustrates another example operation of the techniques discussed herein. At 402 a user 404 is illustrated with a computing device 406 that is a smartphone. The user 404 is not wearing a wearable device. At 402 the computing device 406 is unlocked and a current location of the computing device 406, illustrated as home 408, is a safe location for making user-selectable content visible on a display screen of the computing device 406, so the computing device 406 is operating in a full content visibility mode. As illustrated by display screen 410, in the full content visibility mode all user-selectable content on the computing device is visible on the display screen 410. The user-selectable content is illustrated as two folders labelled "Kid's Games" and "My Games", as well as several icons that represent applications or operating system programs that can be selected by the user 404 for execution. For example, a gear icon represents a settings program, a camera icon represents an image capture program, a speech balloon icon represents a texting application, a music note icon represents a music playback program, an envelope icon represents an email application, a film strip icon represents a video playback program, a calendar icon represents a calendaring program, a business card icon represents a contact list program, a globe icon represents a web browser, and a telephone handset icon represents a telephone communication program.

At 412 the user is illustrated at a later time than at 402. At 412 the computing device 406 is unlocked but a current location of the computing device 406, illustrated as an airport 414, is not a safe location for making user-selectable content visible on a display screen of the computing device 406. Accordingly, the computing device 406 is operating in a reduced content visibility mode. As illustrated by display screen 410, in the reduced content visibility mode a reduced subset of user-selectable content is visible on the display screen 410. The user-selectable content is illustrated as a folder labelled "Kid's Games" as well as a music note icon that represents a music playback program, a camera icon that represents an image capture program, and a film strip icon that represents a video playback program. Icons representing several programs that are not user-selectable content in the reduced content visibility mode are not displayed. For example, compared to the display screen 410, the gear icon, the speech balloon icon, the envelope icon, the calendar icon, the business card icon, the globe icon, and the telephone handset icon are not displayed. Without these icons being displayed, the user 404 is unable to select these icons and run the settings program, the texting application, the email application, the calendaring program, the contact list program, the web browser, and the telephone communication program, respectively.

Figure 5:
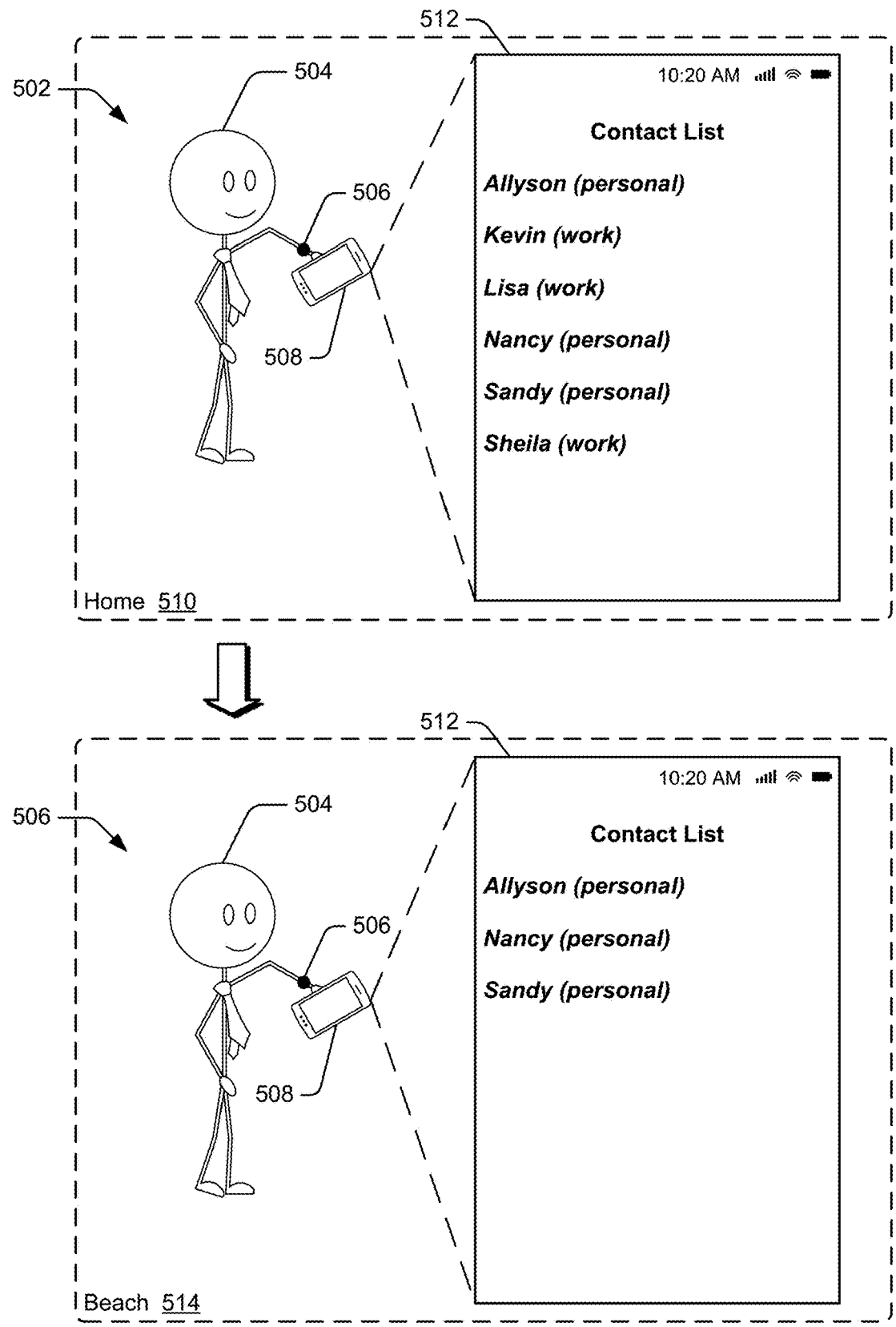

FIG. 5 illustrates another example operation of the techniques discussed herein. At 502 the user 504 wearing a wearable device 506, illustrated as a smartwatch, has a computing device 508 illustrated as a smartphone, is illustrated. At 502 the computing device 508 is unlocked and a current location of the computing device 508, illustrated as home 510, is a safe location for making user-selectable content visible on a display screen of the computing device 508, so the computing device 508 is operating in a full content visibility mode. As illustrated by display screen 512, in the full content visibility mode all user-selectable content on the computing device is visible on the display screen 512. The user-selectable content is illustrated as a contacts list and an individual's name can be selected by the user to display various contact information regarding the individual (e.g., phone numbers, email addresses, mailing addresses), to contact an individual (e.g., call a phone number, send a text message). The contacts list includes various names and an indication of whether the individual is a personal or work contact.

At 514 the user is illustrated at a later time than at 502, still wearing the wearable device 506. At 512 the computing device 508 is unlocked, but the current location of the computing device 508, illustrated as the beach 514, is not a safe location for making user-selectable content visible on a display screen of the computing device 508. Accordingly, at 512 the computing device 508 is operating in a reduced content visibility mode. As illustrated by display screen 512, in the reduced content visibility mode a reduced subset of user-selectable content is visible on the display screen 512. The user-selectable content is illustrated as a contacts list that includes only personal contacts, not work contacts. Without these contacts being displayed, the user 504 is unable to select these contacts and obtain contact information for, or contact, the work contacts.

Returning to FIG. 1, it should be noted that whether a computing device 102 is operating in a full content visibility mode or a reduced content visibility mode can be based on one or both of whether a wearable device 104 is in close proximity to the computing device 102 and whether a current location of the computing device 102 is a safe location for making user-selectable content visible on a display screen of the computing device 102. For example, as illustrated in FIGS. 2 and 3, whether the computing device 208, 308 is operating in a full content visibility mode or a reduced content visibility mode is based on whether the wearable device 206, 306 is in close proximity to the computing device 208, 308 (and optionally the user is authenticated to the wearable device 206, 306, or the user is wearing the wearable device 206, 306, or the user is both authenticated to the wearable device 206, 306 and wearing the wearable device 206, 306) when unlocked. Whether a current location of the computing device 208, 308 is a safe location for making user-selectable content visible on a display screen of the computing device 208, 308 need not factor into whether the computing device 208, 308 is operating in a full content visibility mode or a reduced content visibility mode. By way of another example, as illustrated in FIGS. 4 and 5, whether the computing device 406, 508 is operating in a full content visibility mode or a reduced content visibility mode is based on a whether a current location of the computing device 406, 508 is a safe location for making user-selectable content visible on a display screen of the computing device 406, 508. Whether the wearable device 502 is in close proximity to the computing device 406, 508 need not factor into whether the computing device 406, 508 is operating in a full content visibility mode or a reduced content visibility mode.

However, whether a computing device 102 is operating in a full content visibility mode or a reduced content visibility mode can be based on both whether a wearable device 104 is in close proximity to the computing device 102 (and optionally the user is authenticated to the wearable device 104, or the user is wearing the wearable device 104, or the user is both authenticated to the wearable device 104 and wearing the wearable device 104) and whether a current location of the computing device 102 is a safe location for making user-selectable content visible on a display screen of the computing device 102. For example, the computing device 102 operates in the full content visibility mode in response to a wearable device 104 being in close proximity to the computing device 102 (and optionally the user is authenticated to the wearable device 104, or the user is wearing the wearable device 104, or the user is both authenticated to the wearable device 104 and wearing the wearable device 104) and a current location of the computing device 102 being a safe location for making user-selectable content visible on a display screen of the computing device 102. However, the computing device 102 operates in a reduced content visibility mode in response to a wearable device 104 not being in close proximity to the computing device 102 (or optionally not worn by or the user is not authenticated to the wearable device) or a current location of the computing device 102 not being a safe location for making user-selectable content visible on a display screen of the computing device 102.

Figure 6:
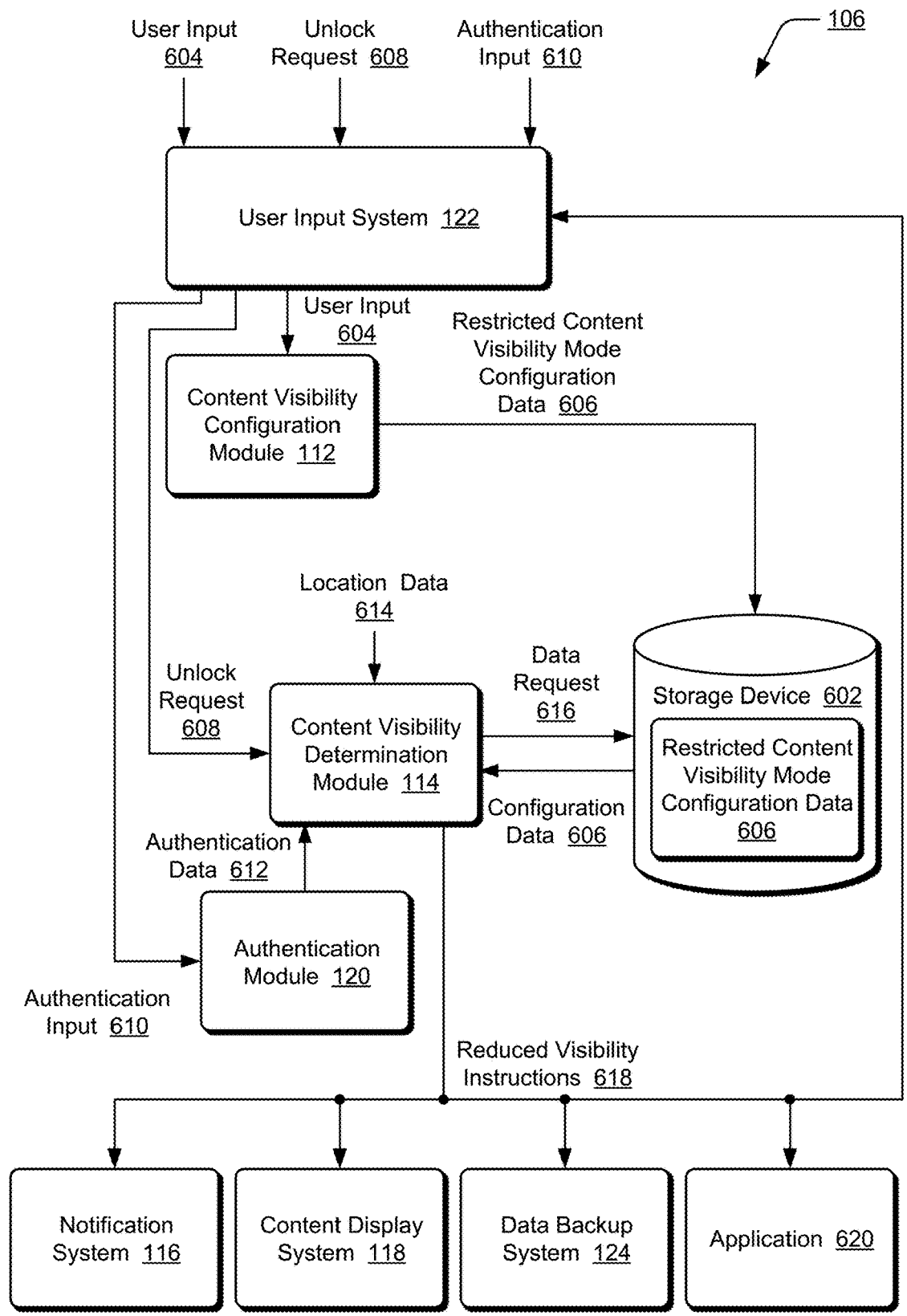
FIG. 6 illustrates some components of a content visibility control system in additional detail.

FIG. 6 illustrates some components of the content visibility control system 116 in additional detail. The content visibility control system 106 includes the content visibility configuration module 112, the content visibility determination module 114, the notification system 116, the content display system 118, the authentication module 120, the user input system 122, the data backup system 124, and a storage device 602. The storage device 602 can be any of a variety of different storage devices or components, such as random access memory (RAM), Flash memory, magnetic disk, and so forth.

The user input system 122 receives inputs of a user to the computing device 102. These inputs can take any of a variety of forms, such as gesture inputs to a touchscreen, touching or tapping inputs to a touchscreen, text inputs to a touchscreen or keypad, audible inputs, cursor control inputs, and so forth.

The content visibility configuration module 112 configures the reduced content visibility mode. Configuring the reduced content visibility mode refers to specifying which user-selectable content is not accessible to the user in the reduced content visibility mode. The remaining user-selectable content that is accessible to the user in the reduced content visibility mode is referred to as being in the reduced subset of user-selectable content. Access to the user-selectable content in the reduced content visibility mode can be controlled in various manners, such as not displaying the content on the computing device screen, blurring or scrambling the content on the device screen, locking or otherwise preventing a user from accessing the content, and so forth as discussed in more detail below.

The user-selectable content refers to content that can be selected by the user. For example, the user-selectable content can include applications or programs that can be executed in response to a user input (e.g., of an icon representing the application or program, inputting of a gesture to run the application or program, selection of a menu item to run the application or program). By way of another example, user-selectable content can include notifications, alerts, and updates associated with applications or programs that can be executed in response to a user input. By way of another example, the user-selectable content can include individual contacts in an address book. By way of another example, the user-selectable content can include photographs, movies, songs, and so forth that can be played back by a media player on the computing device. By way of another example, the user-selectable content can include settings or preferences for the computing device 102 that a user can select (e.g., background images, wallpapers, lock screen images).

The user-selectable content that is in the reduced subset of user-selectable content can be specified in any of a variety of different manners. In one or more implementations, the user input system 122 receives user input 604 specifying the user-selectable content that is not to be displayed in the reduced content visibility mode, and provides the user input 604 to the content visibility configuration module 112. For example, the content visibility configuration module 112 can display a list of user-selectable content and the user can specify (e.g., by touching the content in the list, by selecting buttons or check boxes associated with the content in the list, and so forth) which content is not to be displayed in the reduced content visibility mode.

Additionally or alternatively, the content that is not to be displayed in the reduced content visibility mode can be specified in other manners. For example, the content visibility configuration module 112 can obtain a default set of content that is not to be displayed in the reduced content visibility mode. This set of default content can be obtained from a local storage device (e.g., storage device 602) or a remote storage device (e.g., via the network 126 of FIG. 1).

By way of another example, the content visibility configuration module 112 can obtain a set of content that is not to be displayed in the reduced content visibility mode from a wearable device 104. E.g., the wearable device can receive user input specifying the user-selectable content that is not to be displayed in the reduced content visibility mode, and provide an indication of the specified user-selectable content to the computing device 102 (e.g., the content visibility configuration module 112).

The content visibility configuration module 112 saves configuration data identifying the content in the reduced subset of user-selectable content to the storage device 602, illustrated as reduced content visibility mode configuration data 606. Additionally or alternatively, the reduced content visibility mode configuration data 606 can be stored in a remote storage device (e.g., a wearable device 104, or a storage device accessed via the network 126). The reduced content visibility mode configuration data 606 can identify the content in the reduced subset of user-selectable content in various manners. For example, the content in the reduced subset of user-selectable content can be a list or other record of the user-selectable content that is to be displayed in the reduced content visibility mode.

In one or more embodiments, an unlock request 608 is received by the user input system 122 and provided to the content visibility determination module 114. The unlock request 608 is a request to unlock the computing device 102, and can be an explicit request from the user, such as pushing a button on the computing device 102, inputting a gesture on a touchscreen of the computing device 102, and so forth. The user also optionally provides an authentication input 610 to the user input system 122, which is information used to authenticate the user. The user input system 122 provides the authentication input 610 to the authentication module 120. The authentication input 610 can be any of a variety of authentication information, such as PIN, a name and password, a scanned fingerprint, a scanned face or eye, voice and so forth. Additionally or alternatively, the user can provide the authentication input 610 to the wearable device 104, which in turn provides the received authentication input 610 to the authentication module 120.

The authentication module 120 receives the authentication input 610 and attempts to authenticate the user. The authentication module 120 authenticates the user by comparing the authentication input 610 to known authentication data for the user. The authentication module 120 provides authentication data 612 to the content visibility determination module 114 indicating whether the user is authenticated. The authentication module 120 unlocks the computing device 102 in response to the user being authenticated, and does not unlock the computing device 102 in response to the user not being authenticated. If the authentication module 120 does not unlock the computing device 102 (so the computing device 102 remains locked), a lock screen is displayed to the user and optionally minimal functionality is made available, such as access to make an emergency phone call or use a camera application. However, this lock screen is separate from the reduced content visibility mode, which is enabled when the computing device 102 is unlocked.

Additionally or alternatively, the authentication input 610 can be provided as part of the unlock request 608. For example, the placing of a finger on a fingerprint sensor of the computing device 102 may serve as both the unlock request 608 and the authentication input 610. By way of another example, wearable device 104 can provide a signal (e.g., a wireless key beacon) to the computing device 102 when the wearable device 104 is within communication range of the computing device 102. This signal can serve as the unlock request 608 and the authentication input 610 (e.g., the signal can include a PIN, password, or other information used by the authentication to authenticate the user), and the authentication module 120 unlocks the computing device 102 in response to receipt of the signal from the wearable device 104. Thus, in such situations, the computing device 102 is unlocked simply by the wearable device 104 being within communication range of the computing device 102.

In one or more embodiments, the content visibility determination module 114 determines whether a wearable device 104 associated with the computing device 102 is in close proximity to the computing device 102. This determination can be made in response to the unlock request 608 received by the user input system 122 and provided to the content visibility determination module 114. The content visibility determination module 114 can determine whether a wearable device 104 associated with the computing device 102 is in close proximity to the computing device 102 in a variety of different manners. In one or more embodiments, a wearable device 104 being in close proximity to the computing device 102 refers to the wearable device 104 being within a threshold distance of the computing device 102. This threshold distance can vary, and is optionally user-configurable. This threshold distance can also vary based on the computing device 102 (e.g., 2 feet if the computing device 102 is a smartphone, 10 feet if the computing device 102 is a desktop computer). For example, this threshold distance can range from 2 feet to 10 feet.

In one or more embodiments, the wearable device 104 is determined to be in close proximity to the computing device 102 if the wearable device 104 is within range to communicate with the computing device 102 using a particular communication protocol (e.g., Bluetooth, Bluetooth Low Energy).

Additionally or alternatively, the distance between the wearable device 104 and the computing device 102 can be determined. This distance between the wearable device 104 and the computing device 102 can be determined in a variety of different manners. For example, global positioning system (GPS) coordinates can be obtained by the wearable device 104 and provided to the content visibility determination module 114, which also receives GPS coordinates obtained by the computing device 102. The content visibility determination module 114 compares the two GPS coordinates and determines a distance between them.

Additionally or alternatively, rather than relying on the wearable device 104 being within a threshold distance of the computing device 102, the content visibility determination module 114 can determine whether the wearable device 104 is in close proximity to the computing device 102 in various other manners. For example, the wearable device 104 can detect a signal such as a beacon (e.g., a nearby location beacon) and provide the location indicated in that beacon (or an identifier of the signal) to the computing device 102. The content visibility determination module 114 determines that, if the computing device 102 detects a signal from a location beacon indicating the same location as in the signal detected by the wearable device 104 (or detects the same signal as the wearable device 104), then the wearable device 104 is in close proximity to the computing device 102.

By way of another example, the wearable device 104 can detect a wireless signal (e.g., Wi-Fi signal) having a particular identifier (e.g., basic service set identifier (BSSID)) and signal strength (e.g., received signal strength indicator (RSSI) value). The wearable device 104 communicates that wireless signal identifier and signal strength to the computing device 102. The computing device 102 can also detect a wireless signal having a particular identifier and signal strength. The content visibility determination module 114 determines that, if the wearable device 104 and the computing device 102 both detect a wireless signal having the same particular identifier and signal strength, then the wearable device 104 is in close proximity to the computing device 102.

By way of another example, one of the wearable device 104 and the computing device 102 can emit a sound (e.g., voice frequency or ultrasound). If the other of the wearable device 104 and the computing device detects the sound, then the wearable device 104 is in close proximity to the computing device 102.

By way of another example, both the wearable device 104 and the computing device 102 can detect various sensory data, such as sounds or motions. The wearable device 104 and the computing device 102 can share the sensory data they have detected with each other. The content visibility determination module 114 compares the sensory data (e.g., indications of sounds or motions) that the wearable device 104 detected to the sensory data that the computing device 102 detected and determines that the wearable device 104 is in close proximity if the wearable device 104 detects the same sensory data (e.g., the same sounds, the same motions, the same location) as the computing device 102 detects.

Thus, the content visibility determination module 114 determines whether the wearable device 104 is in close proximity to the computing device 102. Furthermore, in one or more embodiments, the content visibility determination module 114 also determines whether the user is authenticated to the wearable device 104. The user is authenticated to the wearable device 104 by comparing an authentication input to known authentication data for the user. The wearable device 104 itself can authenticate the user and notify the content visibility determination module 114 that the user has been authenticated to the wearable device 104. Additionally or alternatively, the wearable device 104 can provide received authentication inputs (e.g., fingerprint scan, password, voice) to the authentication module 120 and the authentication module 120 can authenticate the user. The user can be authenticated to the wearable device 104 using any of a variety of different authentication mechanisms, such as a fingerprint sensor, face recognition, iris recognition, voice recognition, password or PIN, and so forth. If the user is authenticated to the wearable device 104 and the wearable device 104 is in close proximity to the computing device 102, the computing device 102 operates in the full content visibility mode. However, if the user is not authenticated to the wearable device 104 or the wearable device 104 is not in close proximity to the computing device 102, the computing device 102 operates in the reduced content visibility mode.

Additionally or alternatively, the content visibility determination module 114 also determines whether the wearable device 104 is being worn by a user (e.g., as opposed to just resting on a table). The wearable device 104 itself can determine whether the wearable device 104 is being worn by a user, and provides an indication of that determination to the content visibility determination module 114. Additionally or alternatively, the wearable device 104 can provide received sensor inputs to the content visibility determination module 114 and the content visibility determination module 114 can determine whether the wearable device 104 is being worn by the user. Whether the wearable device 104 is being worn by a user can be determined in various different manners, such as sensing a heart rate, sensing a particular temperature (e.g., between 98 degrees Fahrenheit and 100 degrees Fahrenheit), capacitance detecting skin conductivity, detecting motion consistent with arm movements (e.g., in situations where the wearable device 104 is worn on the user's arm or hand), and so forth. By way of example, if the user is authenticated to the wearable device 104 and the wearable device 104 is in close proximity to the computing device 102 and being worn by the user, the computing device 102 operates in the full content visibility mode. However, if the user is not authenticated to the wearable device 104 or the wearable device 104 is not in close proximity to the computing device 102 or the wearable device 104 is not being worn by the user, the computing device 102 operates in the reduced content visibility mode.

It should be noted that once the user is authenticated to the wearable device 104, the user need not re-authenticate himself or herself as long as the wearable device 104 continues to be worn by the user. For example, the wearable device 104 is monitored (e.g., by the wearable device 104 itself or the authentication module 120) via motion (e.g., a continuous wearability sensor). Once the wearable device 104 is worn and motion or micro motion is taking place, the user is authenticated to the wearable device 104. As long as the wearable device 104 remains worn, the user need not be re-authenticated to the wearable device 104, and the wearable device 104 results in the computing device 102 operating in full content visibility mode. However, if the wearable device 104 ceases to be detected as worn (e.g., the wearable device 104 is lost or no motion is detected), the computing device 102 operates in reduced content visibility mode until the user is again authenticated to the wearable device 104.

In response to the computing device 102 being unlocked and the wearable device 104 that is associated with the computing device 102 being in close proximity to the computing device 102 (and optionally the user is authenticated to the wearable device 104, or the user is wearing the wearable device 104, or the user is both authenticated to the wearable device 104 and wearing the wearable device 104), the content visibility determination module 114 determines that the computing device 102 is to operate in the full content visibility mode. The content visibility determination module 114 need take no further action at this point as all user-selectable content is able to be displayed to the user. However, the content visibility determination module 114 does continue to monitor that the wearable device 104 remains in close proximity to the computing device 102 (and optionally the user is authenticated to the wearable device 104, or the user is wearing the wearable device 104, or the user is both authenticated to the wearable device 104 and wearing the wearable device 104). If the content visibility determination module 114 determines that the wearable device 104 is no longer in close proximity to the computing device 102 (or optionally the user is no longer authenticated to the wearable device 104 or the user is no longer wearing the wearable device 104), the computing device determination module 114 determines that the computing device is to operate in the reduced content visibility mode. In response to such a determination, the content visibility determination module 114 sends out reduced visibility instructions 618 indicating to the systems 116, 118, 122, 124, and optionally application 620, to operate in the reduced content visibility mode as discussed in more detail below.

In one or more embodiments, the content visibility determination module 114 maintains a record of whether the computing device 102 is currently running in the full content visibility mode or the reduced content visibility mode, allowing other programs or applications to query the content visibility determination module 114 to determine whether the computing device 102 is currently running in the full content visibility mode or the reduced content visibility mode.

Additionally or alternatively, the content visibility determination module 114 determines whether a current location of the computing device 102 is a safe location for making user-selectable content visible on a display screen of the computing device 102. This determination can be made in response to the unlock request 608 received by the user input system 122 and provided to the content visibility determination module 114. This determination can be made with or without the wearable device 104 being in close proximity to the computing device 102. In such situations, the content visibility determination module 114 receives location data 614 from one or more sensors of the computing device 102 and/or the wearable device 104, and determines based at least in part on the location data 614 whether the current location of the computing device 102 is a safe location for making user-selectable content visible on a display screen of the computing device.

The location data 614 can be received from various sources. In one or more embodiments, the location data 614 is received from one or more sensors in the computing device 102. Additionally or alternatively, the location data 614 is received from the wearable device 104 (which itself obtains the location data 614 from one or more sensors in the wearable device 104). These sensors can be used to detect, for example GPS coordinates, wind noise, car noise, street noise, locations at the beach, locations at the mall, and so forth. The location data 614 can take various different forms.

In one or more embodiments, the location data 614 identifies a geographic location of the computing device 102. For example, the location data 614 can be GPS coordinates received from a GPS receiver in the computing device 102 and/or the wearable device 104. By way of another example, the location data 614 can be a wireless signal (e.g., Wi-Fi signal) having a particular identifier (BSSID) and signal strength (e.g., RSSI value), which the content visibility determination module 114 can compare to known geographic locations of wireless signals having particular identifiers and signal strengths to determine the geographic location of the computing device 102.

Additionally or alternatively, the location data 614 refers to the context of the computing device 102 (e.g., the environment or setting in which the computing device 102 is situated). For example, given location data 614 from sensors on the wearable device 104 and/or the computing device 102, the content visibility determination module 114 can detect whether the computing device 102 is in a public setting or a private setting. This detection can be performed in various manners, such as based on a noise level of sounds captured by a microphone (e.g., if the noise level of sounds captured by a microphone exceeds a threshold value, such as 80 decibels, then the computing device 102 is in a public setting, otherwise the computing device 102 is in a private setting). This detection can also be based on a number of different voices captured by a microphone (e.g., if a number of different voices captured by a microphone exceeds a threshold value, such as 2, then the computing device 102 is in a public setting, otherwise the computing device 102 is in a private setting). This detection can also be based on a number of different faces captured by a camera of the computing device 102 (e.g., if a number of different faces captured by the camera exceeds a threshold value, such as 2, then the computing device 102 is in a public setting, otherwise the computing device 102 is in a private setting). This detection can also be based on whether any unknown faces are detected within a threshold distance of the computing device 102 (e.g., if at least one unknown face is detected within a threshold distance of the computing device

102, such as 2 feet, then the computing device 102 is in a public setting, otherwise the computing device 102 is in a private setting). This detection can also be based on how many faces other than the user's face are detected within a threshold distance (e.g., if at least a threshold number, such as 3, faces other than the user's face are detected within a threshold distance, such as 2 feet of the computing device 102 then the computing device 102 is in a public setting, otherwise the computing device 102 is in a private setting). This detection can also be based on a number of device signatures (e.g., Wi-Fi signatures, Bluetooth signatures) that are detected by the computing device 102 (e.g., if at least a threshold number, such as 3, device signatures are detected then the computing device is in a public setting, otherwise the computing device 102 is in a private setting).

The content visibility determination module 114 can apply various different rules or criteria to the location data 614 to determine whether the computing device 102 is in a safe location for making user-selectable content visible on a display screen of the computing device 102. Any of a variety of different logical operators can be used to combine the various rules and criteria. For example, the content visibility determination module 114 can determine that the computing device 102 is not in a safe location for making user-selectable content visible if the computing device 102 is in a strange area. A strange area refers to a geographic location that the computing device 102 has not been in before, or a geographic location not within a threshold distance, such as 0.5 miles, of a geographic location that the computing device 102 has been in before. By way of another example, the content visibility determination module 114 can determine that the computing device 102 is in a safe location for making user-selectable content visible if the computing device 102 is at home (e.g., a geographic location or received wireless signal that the user has specified as home, the geographic location or received wireless signal that where the wearable device 104 determines the user typically sleeps).

The presence of people other than the user around the computing device 102 can also be used to determine whether the computing device 102 is in a safe location for making user-selectable content visible. For example, the content visibility determination module 114 can determine that the computing device 102 is not in a safe location for making user-selectable content visible if the noise level of sounds captured by a microphone exceeds a threshold value (e.g., 80 decibels), if a number of different voices captured by a microphone exceeds a threshold value (e.g., 2), if a number of different faces captured by a camera exceeds a threshold value (e.g., 2), whether any unknown faces are within a threshold distance (e.g., 2 feet) of the computing device 102, whether more than a threshold number (e.g., 3) faces other than the user's face are detected within a threshold distance (e.g., 2 feet) of the computing device 102, and so forth.

The content visibility determination module 114 can also factor in time to determine whether the computing device is in a safe location for making user-selectable content visible. For example, the content visibility determination module 114 can determine that the computing device 102 is not in a safe location for making user-selectable content visible if the computing device 102 is in a strange area (e.g., a geographic location that the computing device has not been in before, a geographic location not within a threshold distance, such as 0.5 miles, of a geographic location that the computing device has been in before) at a particular time or within a particular time range (e.g., between midnight and 5:00 AM), but that the computing device 102 is in a safe location for making user-selectable content visible if the computing device is in the strange area at other times (e.g., between 5:00 AM and midnight). By way of another example, the content visibility determination module 114 can determine that the computing device 102 is not in a safe location for making user-selectable content visible if the person using the phone (e.g., based on a phase detected by an image capture device or a voice detected by a microphone) is not the owner of the computing device and has been using the computing device for at least a threshold amount of time (e.g., 1 hour).

Whether the computing device 102 is in a public setting or a private setting can also be used to determine whether the computing device 102 is in a safe location for making user-selectable content visible. For example, the content visibility determination module 114 can determine that the computing device 102 is in a safe location for making user-selectable content visible if the computing device 102 is in a private setting, and that the computing device 102 is not in a safe location for making user-selectable content visible if the computing device 102 is in a public setting. Whether the computing device 102 is in a private setting or a public setting can be determined in various manners using the location data 614. For example, different locations can be associated with private settings (e.g., home), and other locations can be associated with public settings (e.g., airports, gyms, beaches, restaurants, sports venues, etc.). In one or more embodiments, a geographic location can be associated with a private setting or a public setting in various manners. For example, the user can specify (e.g., to the computing device 102 or the wearable device 104) that a particular geographic location or a particular received wireless signal is associated with a particular setting (e.g., home, airport, gym). By way of another example, the content visibility determination module 114 can access a remote service (e.g., the wearable device 104 or a server via the network 126) to obtain a set of known geographic locations or received wireless signals associated with particular settings (e.g., airports, gyms, restaurants).

In response to the computing device 102 being unlocked and the current location of the computing device 102 being a safe location for making user-selectable content visible on a display screen of the computing device 102, the content visibility determination module 114 determines that the computing device 102 is to operate in the full content visibility mode. The content visibility determination module 114 need take no further action at this point as all user-selectable content is able to be displayed to the user. However, the content visibility determination module 114 does continue to monitor that the current location of the computing device 102 remains a safe location for making user-selectable content visible on a display screen of the computing device 102. If the content visibility determination module 114 determines that the current location of the computing device 102 is no longer a safe location for making user-selectable content visible on a display screen of the computing device 102, the computing device determination module 114 determines that the computing device is to operate in the reduced content visibility mode. In response to such a determination, the content visibility determination module 114 sends out reduced visibility instructions 618 indicating to the systems 116, 118, 122, 124, and optionally application 620, to operate in the reduced content visibility mode as discussed in more detail below.

The content visibility determination module 114 determines whether the computing device 102 is to operate in the reduced content visibility mode. This determination can be made in response to the unlock request 608 received by the user input system 122 and provided to the content visibility determination module 114 as discussed above. In response to the computing device 102 being unlocked and the wearable device 104 that is associated with the computing device 102 not being in close proximity to the computing device 102 (or optionally the user is not authenticated to the wearable device 104 or the user is not wearing the wearable device 104), the content visibility determination module 114 determines that the computing device 102 is to operate in the reduced content visibility mode. Additionally or alternatively, in response to the computing device 102 being unlocked and a current location of the computing device 102 not being a safe location for making user-selectable content visible on a display screen of the computing device 102, the content visibility determination module 114 determines that the computing device 102 is to operate in the reduced content visibility mode.

In one or more embodiments, in determining whether the computing device 102 is to operate in the reduced content visibility mode, the content visibility determination module 114 uses both a determination of whether a wearable device 104 associated with the computing device 102 is in close proximity to the computing device 102 (and optionally the user is authenticated to the wearable device 104, or the user is wearing the wearable device 104, or the user is both authenticated to the wearable device 104 and wearing the wearable device 104) and a determination of whether a current location of the computing device 102 is a safe location for making user-selectable content visible on a display screen of the computing device 102. For example, the content visibility determination module 114 determines that the computing device 102 is to operate in the full content visibility mode only if the computing device 102 is unlocked and the wearable device 104 that is associated with the computing device 102 (and optionally the user is authenticated to the wearable device 104, or the user is wearing the wearable device 104, or the user is both authenticated to the wearable device 104 and wearing the wearable device 104) is in close proximity to the computing device 102. However, if the computing device 102 is in a strange area (e.g., a geographic location that the computing device has not been in before) then the content visibility determination module 114 determines that the computing device 102 is to operate in the reduced content visibility mode regardless of whether the wearable device 104 that is associated with the computing device 102 is in close proximity to the computing device 102. User input (e.g., via a menu or other configuration setting) can be received to specify which has higher priority (e.g., the location of the computing device 102 or the wearable device 104 being in close proximity to the computing device 102).

In situations where the computing device 102 is to operate in the reduced content visibility mode, the content visibility determination module 114 submits a data request 616 to the storage device 602 for the reduced content visibility mode configuration data 606. The storage device 602 returns the reduced content visibility mode configuration data 606 to the content visibility determination module 114, which in turn generates and sends reduced visibility instructions 618 to the notification system 116, the content display system 118, the data backup system 124, and optionally one or more applications 620.

The reduced visibility instructions 618 indicate that the computing device 102 is operating in the reduced content visibility mode and further identify the reduced subset of user-selectable content. Additionally or alternatively, one or more of the systems 116, 118, 122, 124, and/or application 620 can already be programmed (or have access to data, such as reduced content visibility mode configuration data 606 in storage device 602) with an indication of the reduced subset of user-selectable content. In such situations, the reduced visibility instructions 618 need not identify the reduced subset of user-selectable content.

Each of the notification system 116, the content display system 118, and the user input system 122 can use the reduced visibility instructions 618 as appropriate to ensure that only the content in the reduced subset of user-selectable content is accessible to the user. The operation of the notification system 116, the content display system 118, and the user input system 122 based on the reduced visibility instructions 618 is discussed in more detail below.

The content display system 118 manages the display of content on the display screen of the computing device 102. In one or more embodiments, in response to receipt of the reduced visibility instructions 618, the content display system 118 ceases displaying identifiers of the user-selectable content that is not in the reduced subset of user-selectable content. The content display system 118 optionally displays user-selectable content on different pages, allowing the user to scroll or otherwise switch to different pages. This ceasing display identifiers of user-selectable content can be performed in different manners, such as not displaying particular identifiers on a page, not displaying particular pages, and so forth.

For user-selectable content that is an application or program not in the reduced subset of user-selectable content, the content display system 118 takes various actions to ensure user-selectable identifiers of the application or program are not displayed. For example, icons or widgets representing the application or program are not displayed, and menus do not display the name of the application or program. By way of another example, files that are associated with the application or program and user selection of which would cause the application or program to execute are not displayed (e.g., icons representing files containing photographs that, if selected, would cause the application or program to execute are not displayed).

For other types of user-selectable content not in the reduced subset of user-selectable content, the content display system 118 takes various actions to ensure the user-selectable content is not displayed. For example, icons representing files containing photographs (or videos, music, etc.) not in the reduced subset of user-selectable content are not displayed. By way of another example, names on a contact list that are not in the reduced subset of user-selectable content are not displayed. By way of another example images not in the reduced subset of user-selectable content are not displayed as background images, lock screen images, wallpaper, and so forth.

Additionally or alternatively, the content display system 120 can take different actions to make the user-selectable content inaccessible to the user. For example, the content display system 120 can display the user-selectable content in a manner to make them unrecognizable to the user. E.g., icons or widgets representing applications, programs, or files can be blurred or scrambled, names on a contact list can be blurred or scrambled, and so forth. By way of another example, the content display system 120 can display the user-selectable content (e.g., icons or widgets representing applications or programs) that are viewable to the user but lock the content or make its content otherwise inaccessible, such as by relying on the user input system 124 to ignore any requests to access the inaccessible content.

As discussed above, the user input system 122 receives inputs of a user to the computing device 102. In response to receipt of the reduced visibility instructions 618, the user input system 122 ignores any user inputs to access user-selectable content that is not in the reduced subset of user-selectable content. Situations can arise where the user input system 122 receives user inputs referring to user-selectable content that is not in the reduced subset of user-selectable content even if no identifiers of that user-selectable content are displayed. For example, the user may input a verbal (or text) command to execute an application or program that is not in the reduced subset of user-selectable content, or the user may input a verbal (or text) command to call a contact that in the reduced subset of user-selectable content.

If the user input system 122 receives a user input to access user-selectable content that is not in the reduced subset of user-selectable content, the user input system 122 ignores the user input. For example, if the user input system 122 receives a verbal command to execute an application that is not in the reduced subset of user-selectable content, the user input system 122 identifies the application specified in the verbal command, determines that the application is not in the reduced subset of user-selectable content, and ignores the verbal command.

In one or more embodiments, content display system 118 suspends execution of user-selectable content that is an application or program not in the reduced subset of user-selectable content. Suspending execution of an application or program can be performed in various manners, such as communicating to a scheduler of the computing device 102 not to schedule the application or program for execution. Thus, user-selectable content that is an application or program not in the reduced subset of user-selectable content ceases to run on the computing device 102 while the computing device 102 is operating in the reduced content visibility mode. The content display system 118 can resume running such applications or programs (e.g., by communicating to the scheduler to resume scheduling the application or program for execution) when the computing device 102 resumes running in the full content visibility mode.

The notification system 116 provides various alerts, updates, and other notifications to the user of the computing device 102. In response to receipt of the reduced visibility instructions 618, the notification system 116 does not display, play back, or otherwise present any alerts, updates, or other notifications for applications or programs that are not in the reduced subset of user-selectable content. For example, if a telephone application is not in the reduced subset of user-selectable content, then a notification of an incoming phone call will not be displayed and no ring tone will be played. By way of another example, if a calendar application is not in the reduced subset of user-selectable content, then reminders of upcoming meetings will not be displayed on the display screen of the computing device 102.

The data backup system 124 backs up new data to the cloud (e.g., to one or more servers via the network 126) in situations in which the computing device 102 is operating in the reduced content visibility mode. Any new data received by the computing device 102 while the computing device 102 is operating in the reduced content visibility mode is stored in the cloud. This new data can be any data input to the computing device 102 by a user (e.g., audible inputs, typed texts), captured photographs or videos, any data received at the computing device 102 from another computing device (e.g., text messages, emails). This allows the content visibility control system 106 to help protect the user from theft of his or her computing device 102. For example, photographs taken or email messages received may provide an indication of where a stolen computing device 102 is or who is in possession of the stolen computing device 102.

In one or more embodiments, the data backup system 124 stores new data to a secure location in the cloud that is associated with the owner (or an authorized user) of the computing device 102 (e.g., the user that was authenticated by the authentication module 120). However, the secure location cannot be accessed from the computing device 102 unless the wearable device 104 associated with the computing device 102 is in close proximity to the computing device 102 (and optionally the user is authenticated to the wearable device 104, or the user is wearing the wearable device 104, or the user is both authenticated to the wearable device 104 and wearing the wearable device 104), or the proper credentials (e.g., user name and password) are otherwise provided. The location in the cloud being secure refers to the location being private and accessible to the owner or authorized user (e.g., with a user name and password), and not being generally available to the public.

In one or more embodiments, when the computing device 102 is in the reduced content visibility mode, the content visibility determination module 114 continues to monitor that the wearable device 104 is not in close proximity to the computing device 102 (and optionally the user is authenticated to the wearable device 104, or the user is wearing the wearable device 104, or the user is both authenticated to the wearable device 104 and wearing the wearable device 104). If the content visibility determination module 114 determines that the wearable device 104 is in close proximity to the computing device 102 (and optionally that the user is authenticated to the wearable device 104, or the user is wearing the wearable device 104, or the user is both authenticated to the wearable device 104 and wearing the wearable device 104), the computing device determination module 114 determines that the computing device 102 is to operate in the full content visibility mode. In response to such a determination, the content visibility determination module 114 sends out new instructions (e.g., reduced visibility instructions 618 or similar instructions) indicating to the systems 116, 118, 122, 124, and optionally application 620, to operate in the full content visibility mode.

Additionally or alternatively, when the computing device 102 is in the reduced content visibility mode, the content visibility determination module 114 continues to monitor that the current location of the computing device 102 is not a safe location for making user-selectable content visible on a display screen of the computing device 102. If the content visibility determination module 114 determines that the current location of the computing device 102 is a safe location for making user-selectable content visible on a display screen of the computing device 102, the computing device determination module 114 determines that the computing device 102 is to operate in the full content visibility mode. In response to such a determination, the content visibility determination module 114 sends out new instructions (e.g., reduced visibility instructions 618 or similar instructions) indicating to the systems 116, 118, 122, 124, and optionally application 620, to operate in the full content visibility mode.

In one or more embodiments, the determination that the computing device 102 is to operate in the reduced content visibility mode can be overridden by the user, causing the computing device 102 to operate in the full content visibility mode. The user can override such determination in various manners, such as providing a user code (e.g., PIN, password, facial image, verbal input), using 2-factor authentication, and so forth. Thus, for example, if the wearable device 104 is not in close proximity to the computing device 102 (e.g., the user forgot to bring his smartwatch with him), full content visibility mode is still accessible to the user.

In some of the discussions above, the computing device 102 is discussed as being in reduced content visibility mode when the wearable device 104 associated with the user and the computing device 102 is not in close proximity to the computing device 102 (and optionally the user is authenticated to the wearable device 104, or the user is wearing the wearable device 104, or the user is both authenticated to the wearable device 104 and wearing the wearable device 104). Additionally or alternatively, the user can provide input to the wearable device 104 that is associated with the computing device 102 and is in close proximity to the computing device 102, the input causing the wearable device 104 to communicate a command to the computing device 102 to switch to the reduced content visibility mode. Similarly, the user can provide an additional input to the wearable device 104 that is associated with the computing device 102 and is in close proximity to the computing device 102, the additional input causing the wearable device 104 to communicate a command to the computing device 102 to switch to full content visibility mode (e.g., operating as a remote control/privacy toggle). These inputs can be provided to the wearable device 104 in various manners, such as selection of a physical button or switch on the wearable device 104, selection of button on a touchscreen, verbal inputs, and so forth. Effectively, these use of these inputs turns the wearable device 104 into a remote control device for the computing device 102, instructing the computing device 102 when to toggle between the reduced content visibility mode and the full content visibility mode.

Allowing the user to provide these inputs to the wearable device 104 that cause the wearable device 104 to send commands to the computing device 102 to toggle between the reduced content visibility and full content visibility modes gives the user of the wearable device 104 better control over the computing device 102. For example, a user may be using his or her computing device 102 when another individual approaches and the user wants to show the other individual something on the computing device 102 but does not want the other individual to see all the content on the computing device 102. The user can provide an input to the wearable device 104 to switch to the reduced content visibility mode, show the other individual what the user wants to, and then provide an input to the wearable device 104 to switch to the full content visibility mode.

Figure 7:
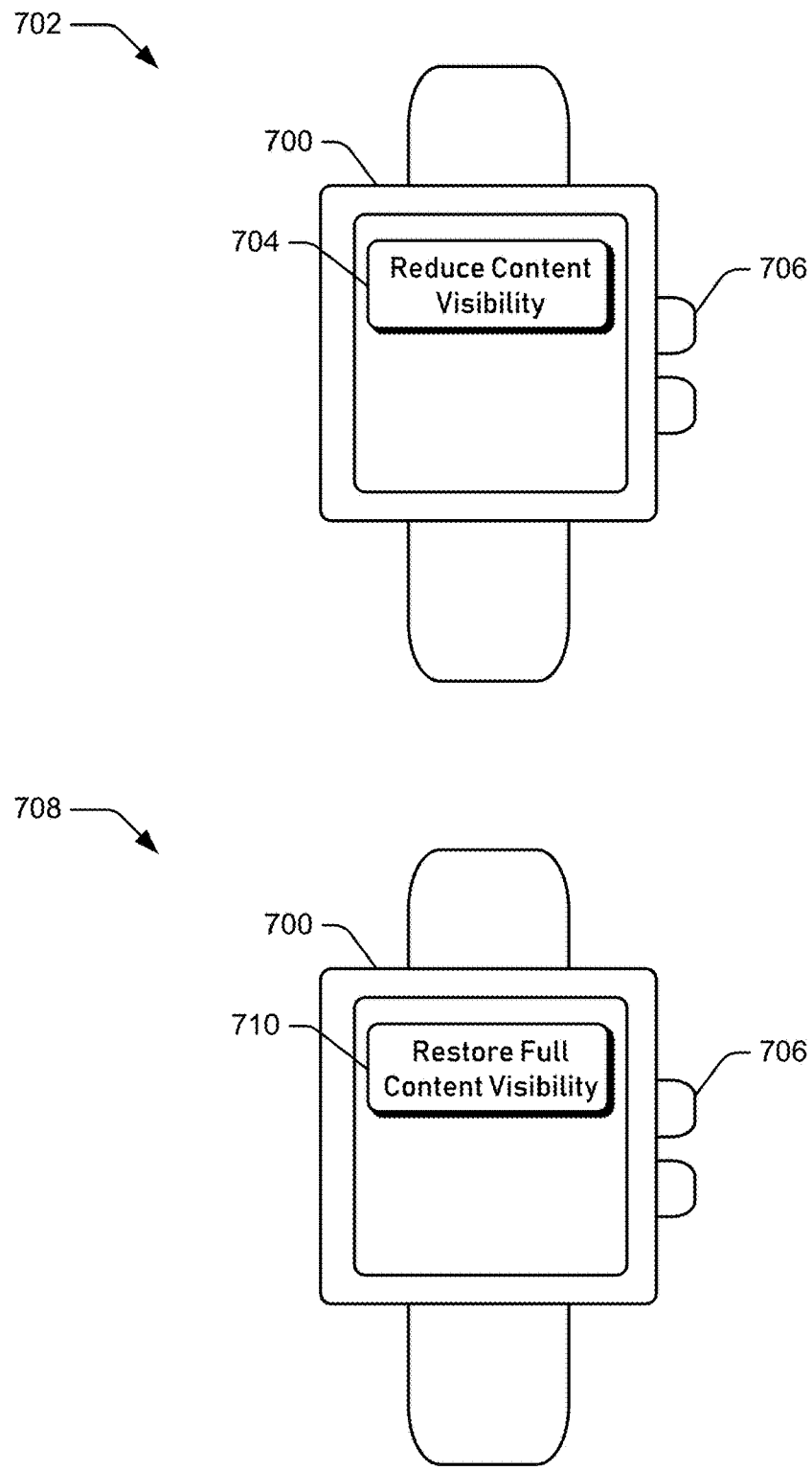
FIG. 7 illustrates an example of a wearable device supporting commands to toggle the computing device between reduced content visibility and full content visibility modes.

FIG. 7 illustrates an example of a wearable device 700 supporting commands to toggle the computing device 102 between reduced content visibility and full content visibility modes. At 702, the wearable device 700 is shown while the computing device 102 is in the full content visibility mode. In response to user selection of the "Reduce Content Visibility" button 704, the wearable device 104 sends a command to the computing device 102 to switch to the reduced content visibility mode. Additionally or alternatively, in response to the user pressing a physical button 706 the wearable device 104 sends a command to the computing device 102 to switch to the reduced content visibility mode.

At 708, the wearable device 700 is shown while the computing device 102 is in the reduced content visibility mode. In response to user selection of the "Restore Full Content Visibility" button 710, the wearable device sends a command to the computing device to switch to the full content visibility mode. Additionally or alternatively, in response to the user pressing the physical button 706 the wearable device sends a command to the computing device to switch to the full content visibility mode.

Although in the example of FIG. 7 both touchscreen buttons and physical buttons are shown, it should be noted that the wearable device 700 need not include both, and may include only touchscreen buttons or a physical button. Furthermore, "Reduce Content Visibility" and "Restore Full Content Visibility" are only examples, and various other buttons or labels could be used. For example, an "Airport Mode On" button can be selected to switch the computing device to the reduced content visibility mode, and an "Airport Mode Off" button can be selected to switch the computing device to the full content visibility mode.

Returning to FIG. 6, in the discussions above the content visibility control system 106 is discussed as supporting a single reduced content visibility mode—e.g., if the wearable device 104 is not in close proximity to the computing device 102 (and optionally the user is authenticated to the wearable device 104, or the user is wearing the wearable device 104, or the user is both authenticated to the wearable device 104 and wearing the wearable device 104), then the computing device 102 operates in the reduced content visibility mode. Additionally or alternatively, the content visibility control system 106 supports multiple reduced content visibility modes, and different content can be displayed in each of these modes. Using multiple reduced content visibility modes, the computing device 102 can operate in one of the multiple reduced content visibility modes when a wearable device 104 associated with the user and the computing device 102 is in close proximity to the computing device 102 (and optionally the user is authenticated to the wearable device 104, or the user is wearing the wearable device 104, or the user is both authenticated to the wearable device 104 and wearing the wearable device 104). Which of multiple reduced content visibility modes the computing device 102 operates in can be determined based on various different factors, such as the user associated with the wearable device, the wearable device itself, a wearable device class that the wearable device belongs to, and so forth.

The content visibility determination module 114 configures each of the reduced content visibility modes. This allows each individual one of the multiple reduced content visibility modes to be user-configured or configured based on a default set of content as discussed above. These multiple reduced content visibility modes can be different levels of reduced content visibility, some making more user-selectable content inaccessible to the user than others. Reduced content visibility mode configuration data 606 is maintained for each of the multiple reduced content visibility modes. A correspondence between particular reduced content visibility mode configuration data 606 and who (e.g., a user) or what (e.g., a wearable device or class of wearable devices) the reduced content visibility mode configuration data 606 corresponds to is also maintained. This correspondence can be maintained in various different manners, such as a list or other record in storage device 602, metadata stored with each particular reduced content visibility mode configuration data 606 indicating to who or what the configuration data corresponds, and so forth. This correspondence allows the content visibility determination module 114 to know which particular reduced content visibility mode configuration data 606 to use given the current use of the computing device 102 (e.g., the user, the wearable device, the class of wearable device).

In one or more embodiments, different reduced content visibility mode configuration data 606 can be associated with each different user of the computing device 102. This allows different users providing different authentication inputs 610 to have different content displayed when the computing device 102 is in the reduced content visibility mode. Users can also provide authentication inputs to a wearable device so that the wearable device can authenticate the user (e.g., based on known authentication data for the user maintained at the wearable device) and notify the computing device 102 which user is using the computing device 102.

Additionally or alternatively, different reduced content visibility mode configuration data 406 can be associated with each different wearable device 104 that is associated with the computing device 102. This allows different wearable devices 104 to have different content displayed when the computing device 102 is in the reduced content visibility mode.

Additionally or alternatively, different types of wearable devices can be in different classes. The class of a wearable device can be determined, for example, by the wearable device identifying its class when the wearable device is paired with the computing device. Each class of wearable device corresponds to particular reduced content visibility mode configuration data 606, allowing wearable devices having different classes to have different content displayed when the computing device 102 is in the reduced content visibility mode. Thus, different reduced subsets of the user-selectable content are displayed for different classes. Classes can be pre-defined, or a user of the computing device 102 can define his or her own classes (e.g., assigning the wearable device 104 to a class when the wearable device 104 is associated with the computing device 102). For example, classes can include an adult class, a teenager class, and a child class. By way of another example, classes can include a computing device owner class and a computing device non-owner class. By way of another example, classes can include a work class and a personal class.

In one or more embodiments, which of multiple reduced content visibility modes the computing device 102 operates in can also be determined based on whether a current location of the computing device 102 is a safe location for making user-selectable content visible on a display screen of the computing device 102. For example, the content visibility determination module 114 determines that the computing device 102 is to operate in a full content visibility mode if the computing device 102 is unlocked and the wearable device 104 that is associated with the computing device 102 (and optionally the user is authenticated to the wearable device 104, or the user is wearing the wearable device 104, or the user is both authenticated to the wearable device 104 and wearing the wearable device 104) is in close proximity to the computing device 102. However, if the computing device 102 is in a strange area (e.g., a geographic location that the computing device has not been in before) then the content visibility determination module 114 determines that the computing device 102 is to operate in a different level of reduced content visibility (e.g., the reduced content visibility mode in which the least amount of user-selectable content is visible) regardless of whether the wearable device 104 that is associated with the computing device 102 is in close proximity to the computing device 102. User input (e.g., via a menu or other configuration setting) can be received to specify which has higher priority (e.g., the location of the computing device 102 or the wearable device 104 being in close proximity to the computing device 102).

Furthermore, any of a variety of different logical operators can be used to combine the various rules and criteria discussed herein for determining whether a current location of the computing device 102 is a safe location for making user-selectable content visible on a display screen of the computing device 102. These various combinations of rules and criteria can also be used to determine which of multiple reduced content visibility modes the computing device 102 operates in. For example, the content visibility determination module 114 can determine that the computing device 102 is to operate in one level of reduced content visibility in response to the computing device 102 not being in strange area, but operate in another level of reduced content visibility (e.g., that makes less user-selectable content accessible to the user) in response to the computing device 102 being in a public setting.

Figure 8:
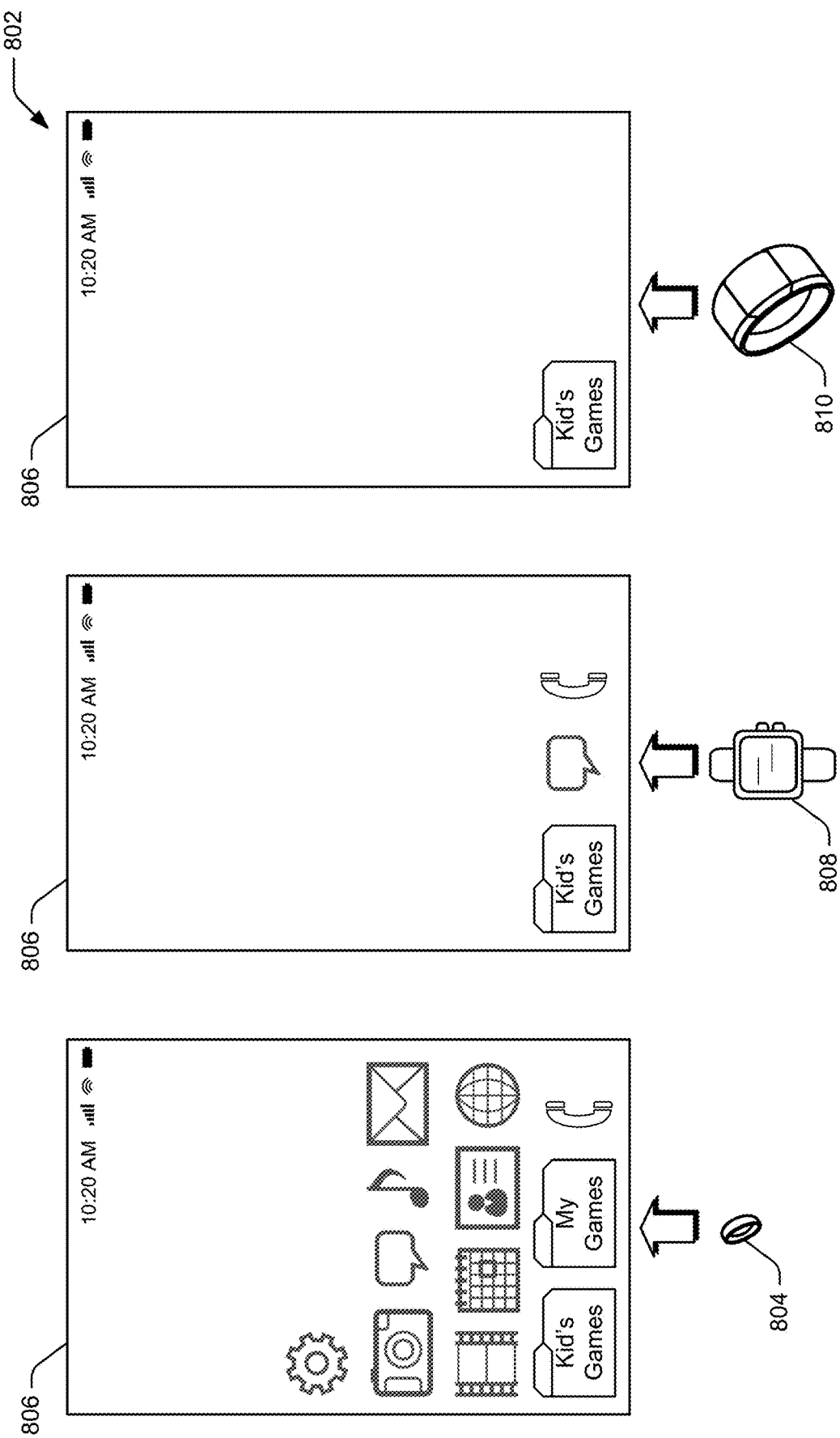
FIG. 8 illustrates another example of the operation of the techniques discussed herein.

FIG. 8 illustrates an example 802 of the operation of the techniques discussed herein. A wearable device 804, illustrated as a ring, is associated with the full content visibility mode. Accordingly, when the wearable device 804 is in close proximity to the computing device 102 (and optionally the user is authenticated to the wearable device 104, or the user is wearing the wearable device 104, or the user is both authenticated to the wearable device 104 and wearing the wearable device 104), all user-selectable content on the computing device is visible on the display screen 806. The user-selectable content is illustrated as two folders labelled "Kid's Games" and "My Games", as well as several icons that represent applications or operating system programs that can be selected by the user for execution. For example, a gear icon represents a settings program, a camera icon represents an image capture program, a speech balloon icon represents a texting application, a music note icon represents a music playback program, an envelope icon represents an email application, a film strip icon represents a video playback program, a calendar icon represents a calendaring program, a business card icon represents a contact list program, a globe icon represents a web browser, and a telephone handset icon represents a telephone communication program.

Another wearable device 808, illustrated as a smartwatch, is associated with a first reduced content visibility mode. The first reduced content visibility mode makes content appropriate for teenagers visible. Accordingly, when the wearable device 808 is in close proximity to the computing device 102 (and optionally the user is authenticated to the wearable device 104, or the user is wearing the wearable device 104, or the user is both authenticated to the wearable device 104 and wearing the wearable device 104), a reduced subset of the user-selectable content is visible on the display screen 806. The user-selectable content is illustrated as a folder labelled "Kid's Games", a speech balloon icon representing a texting application, and a telephone handset icon representing a telephone communication program.

Another wearable device 810, illustrated as a bracelet, is associated with a second reduced content visibility mode. The second reduced content visibility mode makes content appropriate for young children visible. Accordingly, when the wearable device 810 is in close proximity to the computing device 102 (and optionally the user is authenticated to the wearable device 104, or the user is wearing the wearable device 104, or the user is both authenticated to the wearable device 104 and wearing the wearable device 104), a reduced subset of the user-selectable content is visible on the display screen 806. The user-selectable content is illustrated as a folder labelled "Kid's Games".

It should be noted that situations can arise in which multiple wearable devices are in close proximity to the same computing device at the same time, each of which is associated with a different content visibility mode. In such situations, the content visibility determination module 114 applies one or more rules to select one of the multiple content visibility modes. For example, the content visibility mode displaying the most user-selectable content can be selected. By way of another example, the content visibility mode displaying the least user-selectable content can be selected.

Returning to FIG. 6, in one or more embodiments the reduced visibility instructions 618 are also provided to one or more applications 620 on the computing device 102. This allows the application 620 to behave differently based on whether the computing device 102 is running in the reduced content visibility mode or the full content visibility mode. The application 620 can change its behavior in any of a variety of different manners. For example, the application 620 can automatically log a user into an account associated with the application 620 when in full content visibility mode (e.g., a service account allowing access to online content such as movies, songs, email), but not automatically log the user into the account associated with the application 620 when in reduced content visibility mode. By way of another example, various features of the application 620 may be activated when in full content visibility mode (e.g., encryption functionality, virtual private network (VPN) functionality, audio recording functionality, and so forth) but not activated when in reduced content visibility mode.

In one or more embodiments, the application changes behavior while running based on the reduced visibility instructions 618. For example, if the user requests to run the application 620 (e.g., by selecting an icon on the display screen of the computing device 102), the application 620 queries the content visibility determination module 114 for an indication of whether the computing device 102 is currently in the reduced content visibility mode or the full content visibility mode. If the computing device 102 is in the reduced content visibility mode then the application 620 does not automatically log the user into the account associated with the application 620. However, if a few minutes later the application 620 receives reduced visibility instructions 618 indicating that the computing device 102 is in the full content visibility mode, at that point the application 620 automatically logs the user into the account associated with the application 620.

On the other hand, if the computing device 102 is in the full content visibility mode 620 when the user requests to run the application 620, then the application 620 automatically logs the user into the account associated with the application 620. If a few minutes later the application 620 receives reduced visibility instructions 618 indicating that the computing device 102 is in the reduced content visibility mode, then the application 620 optionally logs the user out of the account associated with the application 620 and prompts the user to enter his or her credentials to access the account associated with the application 620.

Figure 9:
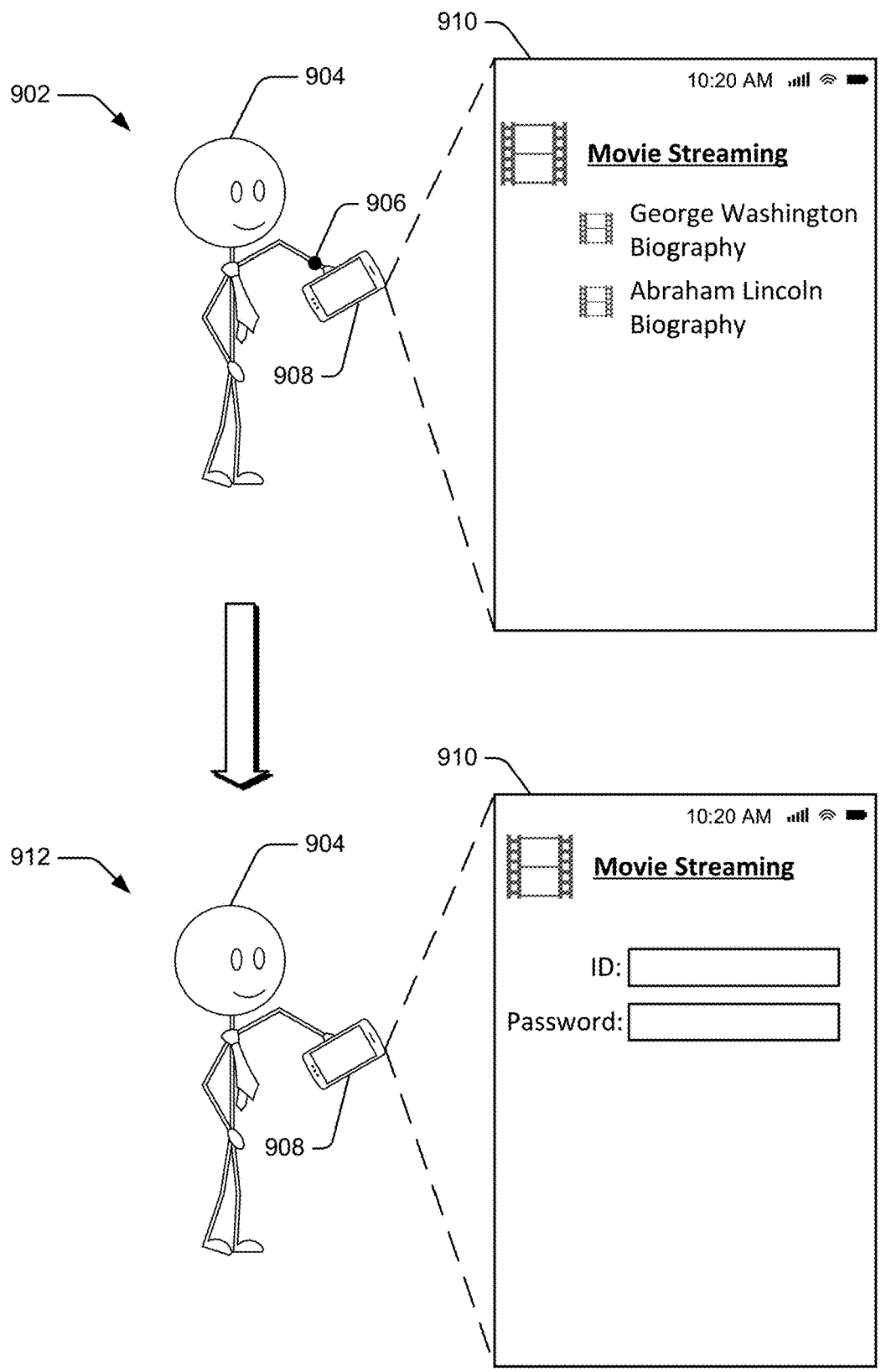
FIG. 9 illustrates an example operation of an application changing behavior.

FIG. 9 illustrates an example operation of an application changing behavior. At 902 a user 904 is illustrated. The user 904 is wearing a wearable device 906 illustrated as a smartwatch, and has a computing device 908 illustrated as a smartphone. At 902 the wearable device 906 is in close proximity to the computing device 908, so the computing device 908 is operating in the full content visibility mode. As illustrated by display screen 910, in the full content visibility mode an email application is displayed. When the user 904 selects to run the video playback application (e.g., by selecting the film strip icon illustrated in FIG. 2), the video playback application automatically logs the user 904 into his or her account using credentials for the user stored by the video playback application. Movies that the user 904 has purchased are available for viewing, illustrated as a George Washington Biography movie, and an Abraham Lincoln Biography movie.

At 912 the user is illustrated at a later time than at 902. At 912, the user 904 is no longer wearing the wearable device 906. Accordingly, at 912 the wearable device 906 is not in close proximity to the computing device 908, so the computing device 908 is operating in a reduced content visibility mode. As illustrated by display screen 910, in the reduced content visibility mode a login page prompting the user to enter his or her credentials to access the account associated with the video playback application is displayed.

Returning to FIG. 6, it should be noted that one or more of the various modules, systems, and storage devices in the content visibility control system 106 can be implemented by the wearable device 104 rather than the computing device 102. For example, the authentication module 120 can be implemented by the wearable device 104 so that the wearable device 104 receives the authentication input 610 and provides the authentication data 612 to the computing device 102. By way of another example, the content visibility determination module 114 can be implemented at least in part by the wearable device 104 so that the wearable device 104 determines a current location of the computing device 102, or the wearable device 104 determines whether a current location of the computing device 102 is a safe location for making user-selectable content visible on a display screen of the computing device 102, or the wearable device 104 determines whether the wearable device 104 is in close proximity to the computing device 102 (and optionally the user is authenticated to the wearable device 104, or the user is wearing the wearable device 104, or the user is both authenticated to the wearable device 104 and wearing the wearable device 104), and so forth. By way of another example, the content visibility determination module 114 can be implemented at least in part by the wearable device 104 so that the wearable device 104 generates the reduced visibility instructions 618.

It should be noted that the controlling content visibility on a computing device based on computing device location techniques discussed herein can be configured by a user of the computing device 102. This configuration can include enabling and disabling these techniques so that they are or are not applied, respectively. This configuration can also be selection of priorities for location-based actions (e.g., particular locations where content visibility is not reduced), whether actions based on location or proximity of the wearable device 104 to the computing device 102 are to have priority, and so forth. This configuration can also be selection of various parameters for determining whether the wearable device 104 is in close proximity to the computing device 102 (e.g., how close the wearable device 104 is to be to the computing device 102 to be in close proximity), whether a particular location is a safe location (e.g., how a safe location for sharing user-selectable content is determined), and so forth.

Thus, as can be seen from the discussion herein, different content visibility modes can be used for the same user account (e.g., the same user login or authentication input). The user need not log into a different user account to switch from the full content visibility mode to a reduced content visibility mode, from a reduced content visibility mode to the full content visibility mode, or from one reduced content visibility mode to another reduced content visibility mode.

Rather, the user can switch between different content visibility modes while using or remaining logged into the same user account.

It should further be noted that, as discussed above, when the computing device 102 is in the full content visibility mode the content visibility determination module 114 continues to monitor whether the computing device 102 is to change to the reduced content visibility mode. Similarly, when the computing device 102 is in the reduced content visibility mode the content visibility determination module 114 continues to monitor whether the computing device 102 is to change to the full content visibility mode. These changes between reduced content visibility mode and full content visibility mode are performed while the user is logged into the computing device 102 (e.g., a new authentication input 610 need not be provided at each change between content visibility modes).

Figure 10:
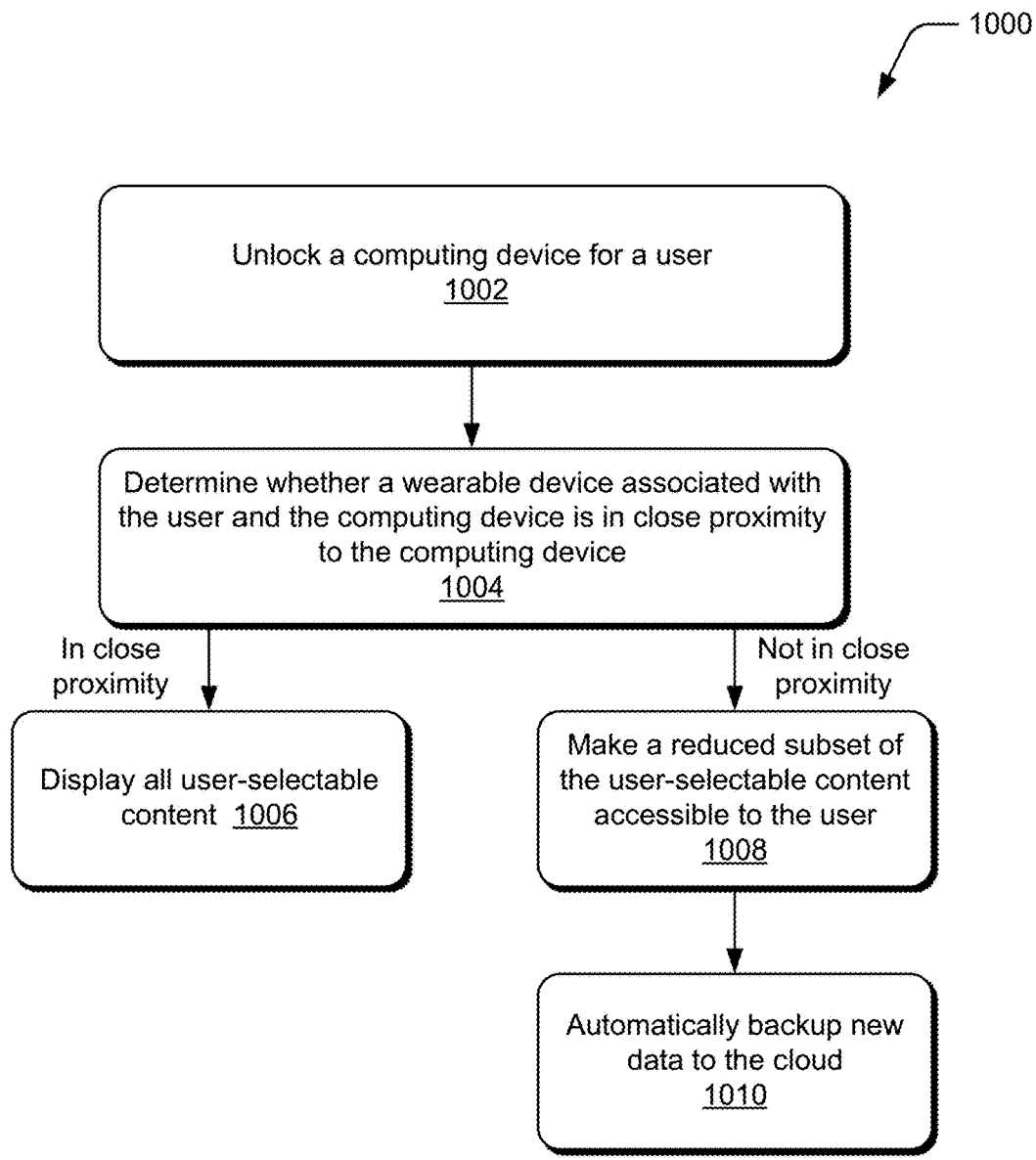
FIG. 10 illustrates an example process for implementing the techniques discussed herein in accordance with one or more embodiments.

FIG. 10 illustrates an example process 1000 for implementing the techniques discussed herein in accordance with one or more embodiments. Process 1000 is carried out by a content visibility control system, such as the content visibility control system 106 of FIG. 1 or FIG. 6, and can be implemented in software, firmware, hardware, or combinations thereof. Process 1000 is shown as a set of acts and is not limited to the order shown for performing the operations of the various acts.

In process 1000, a computing device is unlocked for a user (act 1002). The computing device is unlocked in response to an authentication input that authenticates the user (e.g., verifies that the user is authorized to access user-selectable content and functionality of the computing device). The authentication input can be received in various manners as discussed above, such as a PIN or fingerprint from the user, a signal from a wearable device, and so forth.

A determination is made as to whether a wearable device associated with the user and the computing device is in close proximity to the computing device (act 1004). Whether a wearable device is in close proximity to the computing device can be determined in a variety of different manners as discussed above. This determination optionally includes determining that the user is authenticated to the wearable device, or includes determining both that the user is authenticated to the wearable device and is wearing the wearable device.

In response to determining that a wearable device associated with the user and the computing device is in close proximity to the computing device (and optionally the user is authenticated to the wearable device, or the user is wearing the wearable device, or the user is both authenticated to the wearable device and wearing the wearable device), all user-selectable content is displayed by the computing device (act 1006). As discussed above, the user-selectable content may be displayed across multiple different pages. Furthermore, in act 1006 the computing device is operating in the full content visibility mode.

In response to determining that a wearable device associated with the user and the computing device is not in close proximity to the computing device (or optionally that the user is not authenticated to the wearable device or the user is not wearing the wearable device), a reduced subset of user-selectable content is made accessible to the user (act 1008). Making the reduced subset of user-selectable content accessible to the user can include, for example, content not being fully visible on the computing device screen, content being blurred or scrambled on the device screen, content being visible but otherwise not accessible (e.g., locked), and so forth. As discussed above, the user-selectable content may be displayed across multiple different pages. Furthermore, in act 1008 the computing device is operating in the reduced content visibility mode.

Additionally, in response to determining that a wearable device associated with the user and the computing device is not in close proximity to the computing device (or optionally that the user is not authenticated to the wearable device or the user is not wearing the wearable device), new data received at the computing device is backed up to the cloud (act 1010). Various new data can be backed up to the cloud as discussed above, such as data input by the user of the computing device, data received by the computing device (e.g., email or text messages), images captured by the computing device, and so forth.

Figure 11:
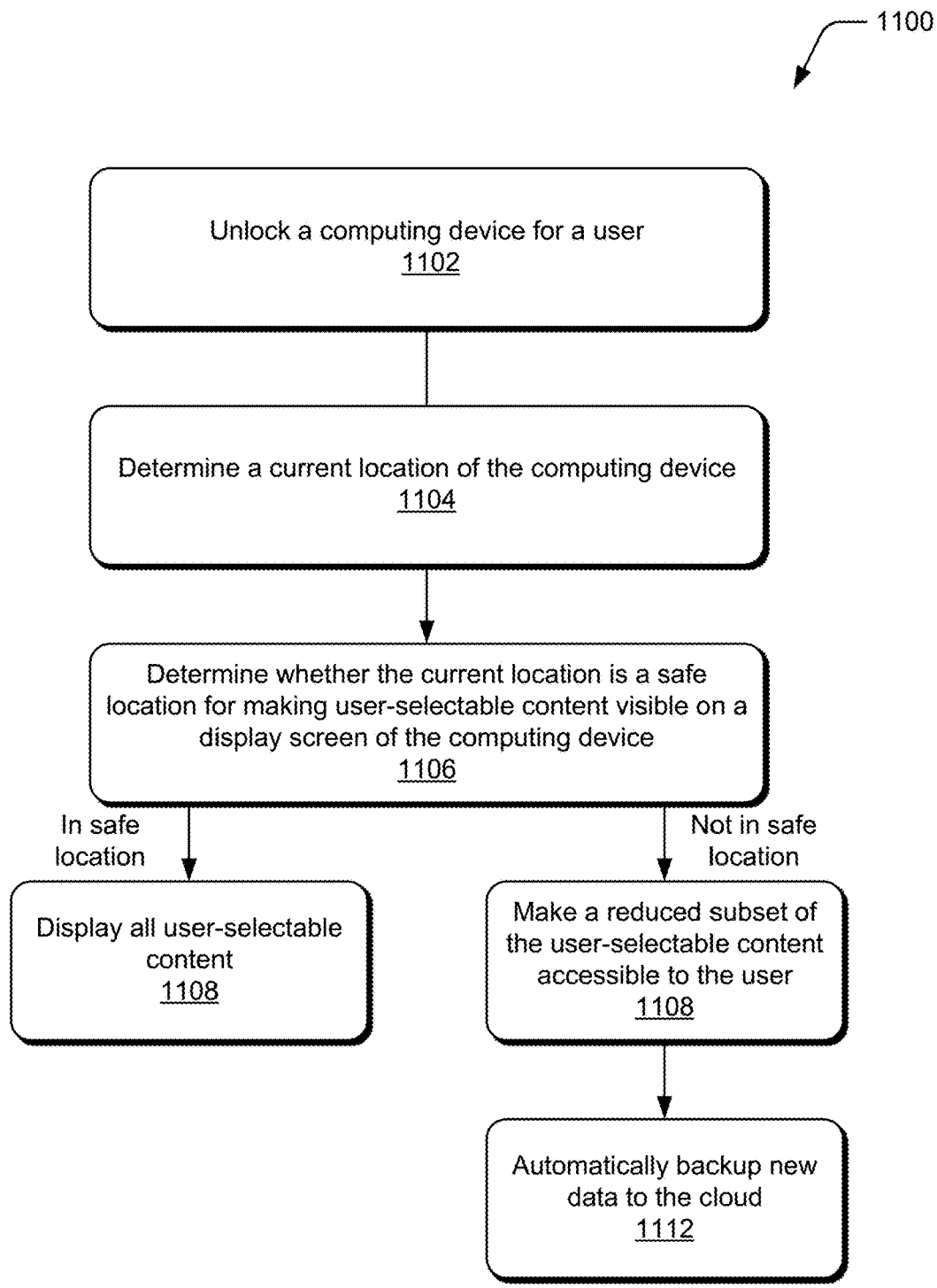
FIG. 11 illustrates another example process for implementing the techniques discussed herein in accordance with one or more embodiments.

FIG. 11 illustrates another example process 1100 for implementing the techniques discussed herein in accordance with one or more embodiments. Process 1100 is carried out by a content visibility control system, such as the content visibility control system 106 of FIG. 1 or FIG. 6, and can be implemented in software, firmware, hardware, or combinations thereof. Process 1100 is shown as a set of acts and is not limited to the order shown for performing the operations of the various acts.

In process 1100, a computing device is unlocked for a user (act 1102). The computing device is unlocked in response to an authentication input that authenticates the user (e.g., verifies that the user is authorized to access user-selectable content and functionality of the computing device). The authentication input can be received in various manners as discussed above, such as a PIN or fingerprint from the user, a signal from a wearable device, and so forth.

A current location of the computing device is determined (act 1104). The current location of the computing device can be determined in a variety of different manners as discussed above, such as using sensors in the computing device or sensors in a wearable device.

A determination is made as to whether the current location is a safe location for making user-selectable content visible on a display screen of the computing device (act 1106). Various different rules or criteria can be applied to the location data to determine whether the computing device is in a safe location for making user-selectable content visible on a display screen of the computing device as discussed above.

In response to determining that the current location is a safe location for making user-selectable content visible on a display screen of the computing device, all user-selectable content is displayed by the computing device (act 1108). As discussed above, the user-selectable content may be displayed across multiple different pages. Furthermore, in act 1108 the computing device is operating in the full content visibility mode.

In response to determining that the current location is not a safe location for making user-selectable content visible on a display screen of the computing device, a reduced subset of user-selectable content is made accessible to the user (act 1110). Making the reduced subset of user-selectable content accessible to the user can include, for example, content not being fully visible on the computing device screen, content being blurred or scrambled on the device screen, content being visible but otherwise not accessible (e.g., locked), and so forth. As discussed above, the user-selectable content may be displayed across multiple different pages. Furthermore, in act 1110 the computing device is operating in the reduced content visibility mode.

Additionally, in response to determining that the current location is not a safe location for making user-selectable content visible on a display screen of the computing device, new data received at the computing device is backed up to the cloud (act 1112). Various new data can be backed up to the cloud as discussed above, such as data input by the user of the computing device, data received by the computing device (e.g., email or text messages), images captured by the computing device, and so forth.

Figure 12:
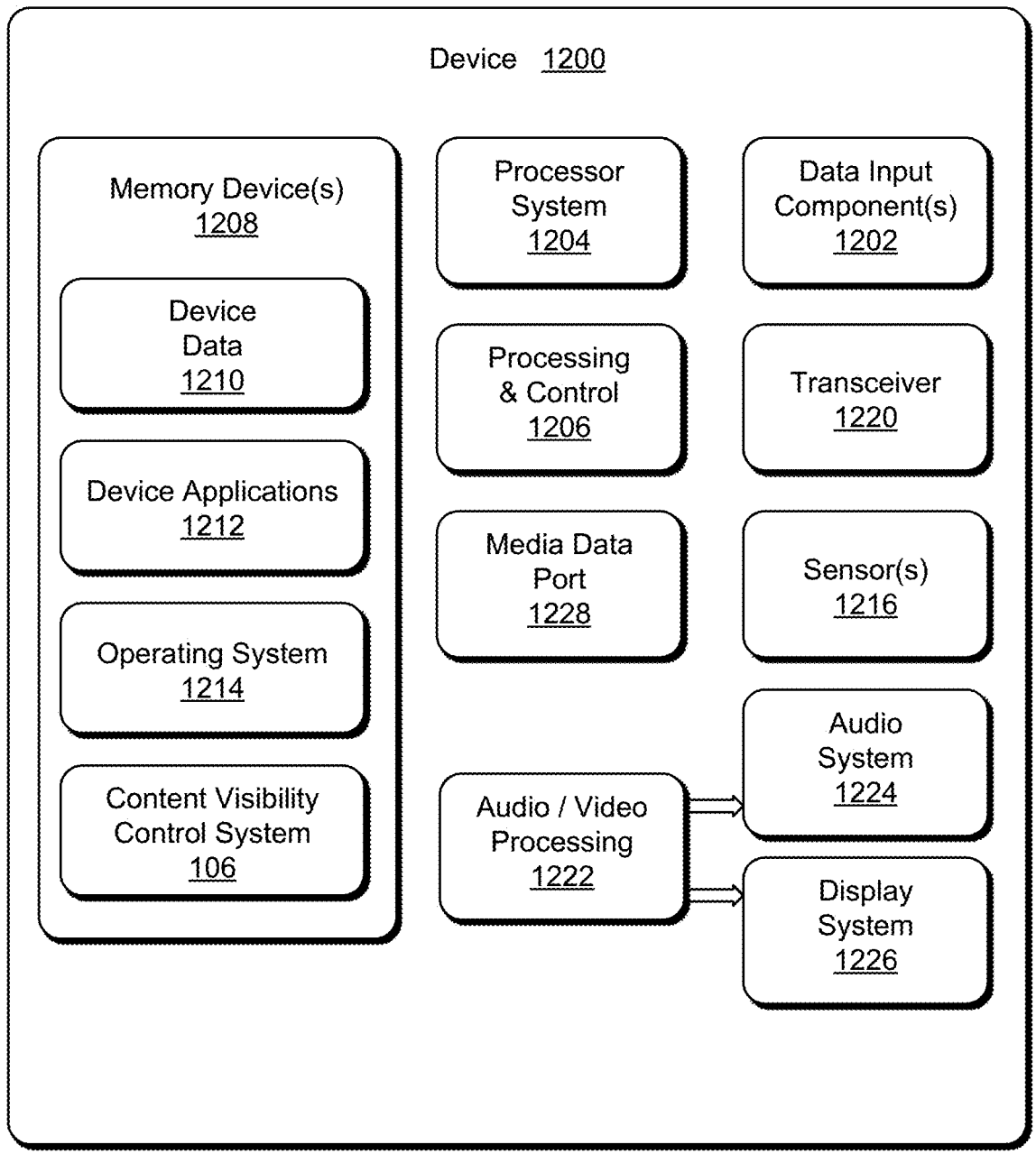
FIG. 12 illustrates various components of an example electronic device that can be implemented as a computing device as described herein.

FIG. 12 illustrates various components of an example electronic device 1200 that can be implemented as a computing device or a wearable device as described with reference to any of the previous FIGS. 1-11. The device 1200 may be implemented as any one or combination of a fixed or mobile device in any form of a consumer, computer, portable, user, communication, phone, navigation, gaming, messaging, Web browsing, paging, media playback, or other type of electronic device.

The electronic device 1200 can include one or more data input components 1202 via which any type of data, media content, or inputs can be received such as user-selectable inputs, messages, music, television content, recorded video content, and any other type of audio, video, or image data received from any content or data source. The data input components 1202 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1202 may also include various other input components such as microphones, touch sensors, keyboards, cameras or other image capture components, and so forth.

The electronic device 1200 of this example includes a processor system 1204 (e.g., any of microprocessors, controllers, and the like) or a processor and memory system (e.g., implemented in a system on a chip), which processes computer executable instructions to control operation of the device 1200. A processor system 1204 may be implemented at least partially in hardware that can include components of an integrated circuit or on-chip system, an application specific integrated circuit, a field programmable gate array, a complex programmable logic device, and other implementations in silicon or other hardware. Alternatively or in addition, the electronic device 1200 can be implemented with any one or combination of software, hardware, firmware, or fixed logic circuitry implemented in connection with processing and control circuits that are generally identified at 1206. Although not shown, the electronic device 1200 can include a system bus or data transfer system that couples the various components within the device 1200. A system bus can include any one or combination of different bus structures such as a memory bus or memory controller, a peripheral bus, a universal serial bus, or a processor or local bus that utilizes any of a variety of bus architectures.

The electronic device 1200 also includes one or more memory devices 1208 that enable data storage such as random access memory, nonvolatile memory (e.g., read only memory, flash memory, erasable programmable read only memory, electrically erasable programmable read only memory, etc.), and a disk storage device. A memory device 1208 provides data storage mechanisms to store the device data 1210, other types of information or data (e.g., data backed up from other devices), and various device applications 1212 (e.g., software applications). For example, an operating system 1214 can be maintained as software instructions with a memory device and executed by the processor system 1204.

In one or more embodiments the electronic device 1200 includes a content visibility control system 106, described above. Although represented as a software implementation, the content visibility control system 106 may be implemented as any form of a control application, software application, signal processing and control module, firmware that is installed on the device 1200, a hardware implementation of the system 106, and so on.

It should be noted that in some situations, at least some of the processing performed by the electronic device 1200 can be offloaded to a distributed system, such as over a "cloud" service. Such a cloud service includes one or more electronic devices to implement at least some of processing discussed herein as being performed by the electronic device 1200.

The electronic device 1200 also optionally includes one or more sensors 1216. These sensors 1216 can be any of a variety of different types of sensors discussed above. For example, sensors 1216 can be sensors detecting location or context of the electronic device 1200, imaging sensors (e.g., cameras or other image capture devices), sound sensors (e.g., microphones), and so forth.

Moreover, in one or more embodiments various techniques discussed herein can be implemented as a computer-readable storage medium having computer readable code stored thereon for programming a computing device (for example, a processor of a computing device) to perform a method as discussed herein. Computer-readable storage media refers to media and/or devices that enable persistent and/or non-transitory storage of information in contrast to mere signal transmission, carrier waves, or signals per se. Computer-readable storage media refers to non-signal bearing media. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. The computer-readable storage medium can be, for example, memory devices 1208.

The electronic device 1200 also includes a transceiver 1220 that supports wireless and/or wired communication with other devices or services allowing data and control information to be sent as well as received by the device 1200. The wireless and/or wired communication can be supported using any of a variety of different public or proprietary communication networks or protocols such as cellular networks (e.g., third generation networks, fourth generation networks such as LTE networks), wireless local area networks such as Wi-Fi networks, Bluetooth protocols, NFC protocols, USB protocols, and so forth.

The electronic device 1200 can also include an audio or video processing system 1222 that processes audio data or passes through the audio and video data to an audio system 1224 or to a display system 1226. The audio system or the display system may include any devices that process, display, or otherwise render audio, video, display, or image data. Display data and audio signals can be communicated to an audio component or to a display component via a radio frequency link, S-video link, high definition multimedia interface (HDMI), composite video link, component video link, digital video interface, analog audio connection, or other similar communication link, such as media data port 1228. In implementations the audio system or the display system are external components to the electronic device. Alternatively or in addition, the display system can be an integrated component of the example electronic device, such as part of an integrated touch interface. For example, the display system 1226 can be configured as any suitable type of display screen, such as an organic light-emitting diode (OLED) display, active matrix OLED display, liquid crystal display (LCD), in-plane shifting LCD, projector, and so forth.

Although embodiments of techniques for implementing controlling content visibility on a computing device based on computing device location have been described in language specific to features or methods, the subject of the appended claims is not necessarily limited to the specific features or methods described. Rather, the specific features and methods are disclosed as example implementations of techniques controlling content visibility on a computing device based on computing device location.

What is claimed is:

1. A method implemented in a computing device, the method comprising:
   unlocking the computing device for a user;
   determining that the computing device is in one of a private setting or a public setting based on whether a noise level detected by a microphone of the computing device exceeds a threshold noise level;
   displaying, in response to determining that the computing device is in the private setting based on the detected noise level not exceeding the threshold noise level, multiple icons on a display screen of the computing device, each respective icon being associated with a set of content that is accessible via selection of the respective icon; and
   in response to determining that the computing device is in the public setting based on the detected noise level exceeding the threshold noise level, displaying a reduced subset of the multiple icons on the display screen, including removing one or more icons that are not in the reduced subset from the display screen and making one or more sets of content associated with the one or more icons inaccessible to the user.

2. The method of claim 1, the determining that the computing device is in one of the private setting or the public setting being further based on a current location of the computing device.

3. The method of claim 1, the displaying the reduced subset of the multiple icons comprising ceasing displaying identifiers of the one or more icons that are not in the reduced subset.

4. The method of claim 1, the making the one or more sets of content inaccessible to the user comprising ignoring user inputs to access the one or more sets of content associated with the one or more icons that are not in the reduced subset.

5. The method of claim 1, the making the one or more sets of content inaccessible to the user comprising not displaying alerts and notifications for applications that are not associated with the reduced subset of the multiple icons.

6. The method of claim 1, further comprising backing up, in response to determining that the computing device is in the public setting, to one or more servers via a cloud service, new data received by the computing device.

7. A computing device comprising:
   a display screen;
   a storage device to store reduced content visibility mode configuration data to operate the computing device in a reduced content visibility mode; and
   a processor system that implements a content visibility control system to:
   unlock the computing device for a user;
   determine that the computing device is in one of a private setting or a public setting based on whether a number of different voices detected by a microphone of the computing device exceeds a threshold number;
   operate, in response to determining that the computing device is in the private setting based on the number of different voices not exceeding the threshold number, in a full content visibility mode in which multiple icons are displayed on the display screen of the computing device, each respective icon being associated with a set of content that is accessible via selection of the respective icon; and
   operate, in response to determining that the computing device is in the public setting based on the number of different voices exceeding the threshold number, in the reduced content visibility mode in which a reduced subset of the multiple icons is displayed on the display screen, one or more icons that are not in the reduced subset are removed from the display screen, and one or more sets of content associated with the one or more icons are made inaccessible to the user.

8. The computing device of claim 7, wherein to determine that the computing device is in one of the private setting or the public setting is further based on a current location of the computing device.

9. The computing device of claim 7, wherein to operate in the reduced content visibility mode is to ignore user inputs to access the one or more sets of content of the one or more icons that are not in the reduced subset.

10. The computing device of claim 7, wherein to operate in the reduced content visibility mode is to not display alerts and notifications for applications that are not associated with the reduced subset of the multiple icons.

11. The computing device of claim 7, wherein the content visibility control system is further to back up, in response to determining that the computing device is in the public setting, to one or more servers via a cloud service, new data received by the computing device.

12. A method implemented in a computing device, the method comprising:
   unlocking the computing device for a user;
   determining that the computing device is in one of a private setting or a public setting based on whether a number of unknown faces detected by a camera of the computing device exceeds a threshold number;
   operating, in response to determining that the computing device is in the private setting based on the number of unknown faces not exceeding the threshold number, in a full content visibility mode in which multiple icons are displayed on a display screen of the computing device, each respective icon being associated with a set of content that is accessible via selection of the respective icon; and
   operating, in response to determining that the computing device is in the public setting based on the number of unknown faces exceeding the threshold number, in a reduced content visibility mode in which a reduced subset of the multiple icons is displayed on the display screen, one or more icons that are not in the reduced subset are removed from the display screen, and one or more sets of content associated with the one or more icons are made inaccessible to the user.

13. The method of claim 12, the operating in the reduced content visibility mode including:

ceasing displaying identifiers of the one or more icons that are not in the reduced subset;

ignoring user inputs to access the one or more sets of content associated with the one or more icons that are not in the reduced subset; and not displaying alerts and notifications for applications that are not associated with the reduced subset of the multiple icons.

14. The method of claim 1, the multiple icons including one or more of: widgets representing applications or programs, folders, user-selectable setting controls, user-selectable device preferences, and user-selectable contacts of a contacts list.

15. The method of claim 1, wherein at least one icon of the multiple icons is displayed on the display screen in response to determining that the computing device is in the private setting and in response to determining that the computing device is in the public setting.

16. The computing device of claim 7, wherein to operate in the full content visibility mode is in response to determining:

the computing device is in the private setting, and a wearable device paired with the computing device is within a threshold distance of the computing device.

17. The computing device of claim 7, wherein to operate in the reduced content visibility mode is further in response to determining:

the computing device is in the public setting, or a wearable device paired with the computing device is not within a threshold distance of the computing device.

18. The computing device of claim 7, wherein at least one icon of the multiple icons is displayed in response to determining that the computing device is in the private setting and in response to determining that the computing device is in the public setting.

19. The method of claim 12, wherein the number of unknown faces are detected within a threshold distance of the computing device.

20. The method of claim 12, wherein the number of unknown faces are faces detected by the camera other than a face of the user.

* * * * *